United States Patent [19]
Kurata et al.

[11] Patent Number: 5,391,865
[45] Date of Patent: Feb. 21, 1995

[54] OPTICAL PICKUP APPARATUS AND OPTICAL GRATING ASSEMBLY THEREFOR

[75] Inventors: Yukio Kurata, Tenri; Hiroshi Ogata, Higashihiroshima; Hikaru Nishihara, Higashihiroshima; Mitsuharu Tomura, Higashihiroshima; Shigeki Tsuji, Higashihiroshima, all of Japan

[73] Assignee: Sharp Kabushiki Kaisha, Osaka, Japan

[21] Appl. No.: 655,231

[22] Filed: Jan. 22, 1991

Related U.S. Application Data

[63] Continuation of Ser. No. 235,901, Aug. 24, 1988, abandoned.

[30] Foreign Application Priority Data

| Aug. 24, 1987 | [JP] | Japan | 62-209934 |
| Aug. 26, 1987 | [JP] | Japan | 62-212603 |
| Aug. 26, 1987 | [JP] | Japan | 62-212604 |
| Aug. 26, 1987 | [JP] | Japan | 62-212605 |
| Aug. 26, 1987 | [JP] | Japan | 62-212606 |

[51] Int. Cl.⁶ .......................................... G01J 1/20
[52] U.S. Cl. ............................ 250/201.5; 369/44.12; 369/44.23; 369/44.37
[58] Field of Search ............. 250/201.5, 216, 237 R; 369/44.12, 44.23, 44.37; 359/566

[56] References Cited

U.S. PATENT DOCUMENTS

| 4,498,159 | 2/1985 | Daimon . | |
| 4,612,437 | 9/1986 | Ohsato . | |
| 4,672,187 | 6/1987 | Fujita et al. | 369/45 |
| 4,718,052 | 1/1988 | Kondo et al. | 369/44 |
| 4,731,772 | 3/1988 | Lee | 369/112 |
| 4,733,065 | 3/1988 | Hoshi et al. | 369/112 |
| 4,733,943 | 3/1988 | Suzuki et al. . | |
| 4,753,513 | 6/1988 | Shikama | 369/112 |
| 4,768,183 | 8/1988 | Ohnishi et al. | 369/112 |
| 4,794,585 | 12/1988 | Lee | 369/46 |
| 4,825,064 | 2/1989 | Ando . | |
| 4,829,506 | 5/1989 | Bressers et al. | 350/3.72 |
| 4,832,464 | 5/1989 | Kato et al. | 350/3.72 |
| 4,876,680 | 10/1989 | Misawa et al. | 369/112 |
| 4,904,856 | 2/1990 | Nagahama et al. . | |
| 4,918,300 | 4/1990 | Tsuji et al. . | |

FOREIGN PATENT DOCUMENTS

| 0123048 | 2/1984 | European Pat. Off. . |
| 0188624 | 7/1985 | European Pat. Off. . |
| 0195657 | 3/1986 | European Pat. Off. . |
| 0199565 | 4/1986 | European Pat. Off. . |
| 0226403 | 6/1987 | European Pat. Off. . |
| 0288620 | 12/1988 | European Pat. Off. . |
| 60-28044 | 2/1985 | Japan . |
| 61-126644 | 6/1986 | Japan . |
| 63-66741 | 9/1986 | Japan . |
| 62-58432 | 3/1987 | Japan . |
| 130035 | 7/1987 | Japan . |
| 135737 | 7/1987 | Japan . |
| 63-113948 | 5/1988 | Japan . |
| 63-104231 | 9/1988 | Japan . |
| 8602980 | 11/1986 | Netherlands . |
| 2059664 | 9/1980 | United Kingdom . |

OTHER PUBLICATIONS

IBM Technical Disclosure Bulletin "Multi-function Holographic Optical Element for Readout of High Density Recorded Data", M. R. Latta et al; vol. 22, No. 4, Sep. 1979.

Philips Technical Review "A Semiconductor Laser For Information Read-out"; J. C. J. Finck, et al, vol. 39, No. 2, 1980, pp. 37-47, Eindhoven, L.

European Search Report.
Annex to the European Search Report.

*Primary Examiner*—David C. Nelms

[57] ABSTRACT

An optical pickup apparatus for optically reading the data stored in a flat information carrier disc in the form of tiny pits. The pickup apparatus directs a beam of light from a light source to the disc surface. The impinging beam is modulated by the data pits and reflected back to a photodetector. A novel optical grating assembly is disposed between the light source and the information disc, and includes a diffraction grating for the light beam from the source and a holographic grating for directing part of the light beam reflected by the disc to the photodetector. The diffraction and holographic gratings are formed integral with each other into the grating assembly.

98 Claims, 21 Drawing Sheets

OPTICAL PICKUP APPARATUS AND OPTICAL GRATING ASSEMBLY THEREFOR

This application is a continuation of application Ser. No. 235,901, filed on Aug. 24, 1988, now abandoned.

BACKGROUND OF THE INVENTION

1. Field of the Invention

This invention relates to an optical pickup apparatus and an optical grating assembly for the apparatus. More particularly, this invention relates to an optical pickup apparatus for reading information stored in an information carrier disc by directing small read-out spots of light to the disc and detecting the light reflected therefrom by a photosensitive detector, and an optical grating assembly suitable for use in such pickup apparatus.

2. Description of the Related Art

Information carrier discs are known in the art where data are stored and arranged along a spiral track having a succession of reflective elements. The reflective elements on the track generally are in the form of hollows called "pits", which hold audio, video or other information in a digital form. The information carriers, which are also dubbed as optical discs, are finding their way rapidly into the music, movie and computer industries.

In order to read out the information stored in the carrier disc, an optical read-out or pickup device is used. FIG. 1 schematically illustrates the arrangement of a conventional optical device which employs a three-beam method for tracking servo control and an astigmatic detection for focusing servo. Before a detailed description of FIG. 1, is provided the three-beam method and astigmatic detection are briefly explained with reference to FIGS. 2 and 3.

In FIG. 2, the three-beam method for tracking servo control uses three beams of light: a main beam concentrated into a main reading spot 18a and a pair of sub-beams focused into a pair of sub-reading spots 18b and 18c on the opposite sides of the main reading spot 18a. A tracking error signal is obtained by sensing the amount of difference between the pair of reflected sub-beams.

In FIG. 3, the astigmatic detection for focusing servo control makes use of a cylindrical lens which acts as a lens with respect to light in one direction but does not act as a lens with respect to light in the opposite direction. A beam of light passing through the cylindrical lens forms a circular spot at the focal point, and distorted circular spots or elliptical spots on the far and near sides of the focal point. Any variation in shape of the reading spot of beam is electrically detected to thereby generate a focus error signal.

Now referring to FIG. 1, the optical pickup or read-out device includes a lens source. A laser beam 16 emitted by the laser source 1 is directed to a diffraction grating 12 where it is diffracted into a zero-order diffracted main beam 17a and a pair of first-order diffracted sub-beams 17b and 17c. The main beam 17a is for reading out the pit information recorded on the disc and for sensing the focusing error, while the two sub-beams 17b and 17c are for sensing the tracking error or failure of the main reading beam. The three diffracted beams 17a, 17b and 17c are directed to a planar beam splitter 13 provided with a half-silvered surface or mirror 13a where they are reflected toward a collimating lens 5. The three beams pass out of the collimating lens 5 in parallel. The collimated beams continue to an objective lens 6 which focuses the beams into three spots 18a, 18b and 18c on the surface of the information carrying disc 7 in a pattern as shown in FIG. 2.

The main reading spot 18a is derived from the main beam 17a, whereas the sub-spots 18b and 18c are delivered from the sub-beams 17b and 17c. The spot forming beams 17a, 17b and 17c are modulated by the data carrying track on the disc and reflected back through the objective lens 6 and the collimating lens 5 toward the beam splitter 13, following substantially the identical path. The beam splitter is disposed oblique or at an angle with respect to the optical path of the returning beams, while the returning beams impinge obliquely on the beam splitter 13 and pass therethrough. The length of the optical paths, for example, 1 and m within the beam splitter for the light beams passing therethrough vary depending on the locations at which those beams strike the splitter. The net result is similar to sending the beams through a cylindrical lens, and, thus, astigmatism is developed. The returning beams transmitted through the beam splitter 13 proceed to a plane concave lens 14 by which the incident beams are axially or longitudinally magnified and focused into spots 19a, 19b and 19c onto a six-segment photosensitive detector 15. These beam spots 19a, 19b and 19c are projected on the photodetector 15 in various patterns as shown in FIGS. 4A–4C depending on the positions of the disc 7 relative to the objective lens 6. It is noted that the spot 19a is derived from the main beam 17a, while the spots 19b and 19c are derived from the sub-beams 17b and 17c, respectively.

Turning to FIGS. 4A–4C, the photodetector 15 includes photosensitive segments A–D arranged in a square configuration to receive the main spot of beam 19a, and a pair of similar photosensitive segments E and F disposed on both sides of the square array if segments A–D for receiving the sub-spots 19b and 19c of the beam. When the surface of the information carrying disc 7 is situated in the focal plane of the objective lens 6 and it is thereby made possible for the reading spots to be focused in the data track of the disc, the beam spots 19a–19c are projected on the photodetector in the shape of round circles and in the pattern as shown in FIG. 4B. If the disc surface is closer to the objective lens beyond its focal point, i.e. if the disc surface is positioned on the near side of the focal point of the objective lens, then the projected beam spots take the form of ellipses or oval circles arranged as shown in FIG. 4A. On the other hand, when the disc surface is farther than the focal point of the objective lens i.e. when the disc surface is positioned on the far side of the focal point of the objective lens, the beam spots 19a–19c are projected on the photodetector 15 in the form of oval circles and in a pattern as shown in FIG. 4C.

A pit signal RF obtained by reading the pits in the data track of the disc with the read-out light spots is expressed by the following equation:

$$RF = a + b + c + d$$

where a, b, c and d represent electrical signals corresponding to the amount of light received on the photosensitive segments A, B, C and D, respectively.

A tracking error signal TES provided by the three-beam method is expressed as follows:

$$TES = e - f$$

where e and f represent electrical signals proportional to the amount of light projected and received on the photosensitive segments E and F, respectively.

A focus error signal FES generated by the astigmatic detection is expressed as follows:

$$FES = (a+d) - (b+c).$$

Whenever a tracking error is sensed by a tracking error detector 41, a lens actuator or a driver 44 operates in response to the output signal from the detector 41 to move the objective lens 6 in a direction and an amount to correct the error. Likewise, when a focusing error is sensed by a focusing error detector 42, a lens actuator or a driver 43 operates responsive to the output signal from the detector 42 to move the objective lens 6 in a direction and an amount to correct the focusing error. In this manner, the position of the objective lens 6 relative to the disc 7 is always adjusted so that the disc surface is kept in the focal plane of the objective lens and the reading beam spots are focused right on the data track of the disc, so that accurate and reliable read-out of the pits in the data track are assured.

In FIG. 5, there is schematically illustrated another conventional optical pickup device which incorporates a holographic grating. The pickup device relies on the push-pull method for tracking servo control and on the wedge prism method for focusing servo control.

Before a description of the optical pickup device of FIG. 5, is provided the push-pull and wedge prism methods will be briefly explained.

Turning to FIG. 7, the push-pull detection employs a single spot of beam for reading the information stored in the form of a pit on the disc. When the reading spot illuminated on the information track is in perfect registration with the data pit as represented by the center spot in FIG. 7, two photosensitive segments of a photodetector 45 receive equal amounts of reflected light. However, any lateral deviation of the projected light spot with respect to the data pit causes a difference in the intensity of light impinging on the photosensitive segments. This difference sensed by the photodetector 45 produces a signal indicating the tracking error.

The wedge prism method for focusing servo control employs a wedge prism 46 as shown in FIG. 8A. One face of the prism is contoured in the form of a V shaped valley. A beam of light incident on the wedge prism emanates therefrom in two beams of light as illustrated in FIG. 8B. At its focal point F, the transmitted beams are converged into tiny spots, while at positions X and Y on the near and far sides, respectively, of the focal point, the beams form semicircular spots of different size and orientation. The varying semicircular spots of the light beams are sensed by a photodetector, which produces electric outputs indicating focusing errors.

Now turning to FIG. 5, the optical pickup device includes a laser source 1. A laser beam 22 from the source of laser 1 is directed to the holographic grating 20. FIG. 6 illustrates the holographic grating 20 in an enlarged perspective view. The holographic grating 20 includes a glass or plastic plate member formed with a number of fine curved grooves or slits for diffracting the light beam passing therethrough. In order for the diffraction grating 20 to function like a wedge prism, the grating is divided into two sections 20a and 20b.

Turning back to FIG. 5, the holographic grating 20 diffracts the laser beam 22 from the source into several diffraction orders. Among them, only the zero-order diffraction beam continues to a collimating lens 6. The first-order diffraction beam wholly misses the collimating lens 6 because it has a larger diffraction angle. The zero-order diffraction beam passing through the collimating lens 6 is turned into parallel beams. The collimated beams are oriented to an objective lens 6 which focuses them into a spot of light on the surface of the information carrier disc 7. The impinging beam is reflected by the disc 7 and is returned to the holographic grating 20 along substantially the same optical path. The return beam is diffracted into several orders by the diffraction grating 20. The zero-order diffraction beam proceeds toward the laser source 1, while the first-order diffraction beam is directed to a four-segment photodetector 21. As stated hereinabove in connection with FIG. 6, the holographic grating 20 is divided into grating sections 20a and 20b along a line oriented in a tangential direction of the disc 7 (while the dividing line is conspicuous in the drawing for showing the boundary between the grating sections, but no such line exists in an actual holographic grating).

As can also be seen in FIG. 6, the sections 20a and 20b are formed with grating grooves of different designs or patterns so that the first-order diffracted beams emanating from these sections are converged onto different points. More specifically, the two first-order diffracted beams 24a and 24b emanate from the holographic grating 20 due to its composite structure. The beams 24a and 24b impinge on a four-segment photodetector 21 to form spots of light 25a and 25b. The formations of light spots 25a and 25b on the photodetector 21 enlarged and shown in FIGS. 9A-9C where the alphabetical letters A, B, C and D denote photosensitive segments including the photodetector 21. In an erroneous read-out situation where the disc 7 lies closer to the objective lens 6 beyond its focal point, i.e. the disc is located within the focal length of the objective lens 6, semicircular spots 25a and 25 are formed on the outermost photosensitive segments A and D as shown in FIG. 9A. When the disc 7 lies in the focal plane of the objective lens 6, i.e. the disc is at the focus of the objective lens, tiny spots of light are projected on the photodetector 21 as shown in FIG. 9B. If the disc 7 lies farther away from the objective lens beyond its focal point, i.e. if it is positioned outside the focal length of the objective lens, semicircular spots 25a and 25b are illuminated on the innermost photosensitive segments B and C as shown in FIG. 9C.

A pit signal RF obtained by optically reading the disc 7 is expressed as follows:

$$RF = a+b+c+d$$

where a, b, c and d represent electrical signals corresponding to the amount of light received by the photosensitive segments A, B, C and D, respectively.

A tracking error signal TES provided by the push-pull method is expressed as follows:

$$TES = (a+b) - (c+d).$$

The wedge prism method provides a focusing error signal FES expressed by the following equation:

$$FES = (a+d) - (b+c).$$

It should be noted that the composite holographic grating 20 acts optically like a wedge prism.

Referring again to FIG. 5, when a focusing error is sensed by a focusing error detector 42, a lens actuator 43 operates to drive the objective lens 6 in a direction and an amount to correct the error. Likewise, as a tracking error detector 41 senses a tracking error, another actuator 44 operates to move the objective lens 6 in a direction and an amount to offset the focusing error. Thereby, an accurate and a reliable reading of the pits on the disc is achieved.

The conventional optical pickup devices of the type described above, while generally satisfactory in optical read-out operation, suffer some drawbacks.

The optical pickup device of FIG. 1 which employs the three-beam detection for the tracking servo control provides an excellent ability to detect tracking error. However, this device requires both the diffraction grating 12 and the plane beam splitter 13 for the diffraction of the laser beam, as compared with a single holographic grating for the optical pickup device of FIG. 5 based on the push-pull detection method. One additional component part means one additional assignment of operational adjustment as well as additional costs.

On the other hand, in the pickup device of FIG. 5 which relies on the push-pull detection technique, a single holographic grating 20 is sufficient for the intended diffraction of the laser beam. One fewer component part and one fewer assignment for the operational adjustment in this pickup device is used than in the device based on the three-beam detection which leads to a considerable cost reduction. However, the push-pull type of the pickup device is disadvantageous in that the tracking error signal fluctuates with varying pit depths and it is impossible to obtain a stable and constant tracking error signal.

SUMMARY OF THE INVENTION

It is, therefore, an object of the invention to provide an optical pickup apparatus for optically reading information stored in a flat information carrier.

It is another object of the invention to provide an optical pickup apparatus for optically reading a flat information carrier which uses a three-beam method for tracking servo control and which is simpler in construction than similar conventional apparatus.

It is still another object of the invention to provide a novel optical grating assembly suitable for use in the optical pickup apparatus.

Briefly described, according to one preferred embodiment of the invention, there is provided an improved optical pickup apparatus for optically reading information recorded on a flat information carrying disc in the form of a spiral track of successive pits. The apparatus includes a radiant light source for emitting a radiation beam. The radiant beam from the light source is separated by a first optical grating into a main beam for reading the data pits on the information carrying disc, and a pair of sub-beams for sensing tracking errors of the read-out beam. The beams of radiant light are focused into three tiny reading spots on the surface of the information disc, which are then reflected back by the disc surface. The optical pickup apparatus also includes a second optical grating which directs part of the beam reflected from the information disc to a photosensitive detector. The photosensitive detector, then, produces electrical outputs indicating focusing error as well as tracking error. The pickup apparatus corrects focusing and tracking errors in response to the output signals from the photodetector while optically reading the data pits on the disc. The first and second optical gratings are integrally formed into a unitary grating assembly.

According to one aspect of the invention, the unitary grating assembly comprises a first optical grating positioned to face towards the source of the radiant light and a second optical grating arranged to face towards the information disc. In a preferred embodiment of the invention, the first optical grating is a diffraction grating and the second optical grating is a holographic grating.

These objects and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF PREFERRED EMBODIMENTS

Figure 10:
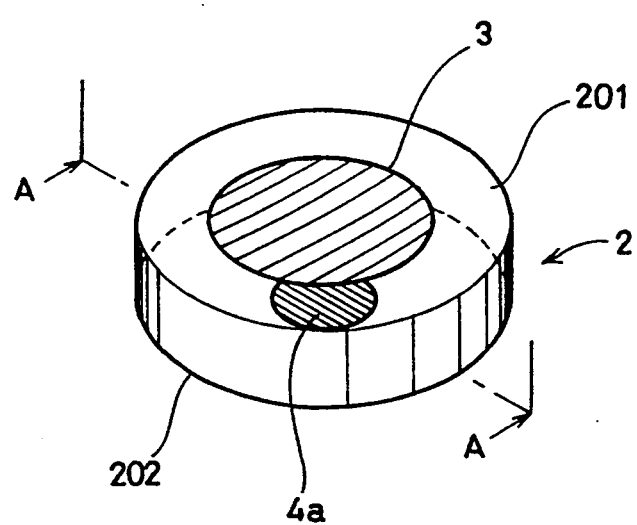
FIG. 10 is an enlarged perspective view of an optical grating assembly according to a preferred embodiment of this invention.

Referring now to FIG. 10, there is illustrated a grating assembly for use in an optical pickup apparatus according to this invention. The grating assembly 2 has a face 202 turning toward a source of radiant light and is provided with a diffraction grating 4a as a first grating component. The diffraction grating 4a functions to distribute a light beam from the source into a main beam for reading a data pit formed on the information carrying disc, and a pair of sub-beams for sensing a tracking error of the main reading beam. The other face 201 of the grating assembly 2 turning toward the information carrying disc is provided with a holographic grating 3 as a second grating component. The holographic grating 3 includes a number of curved parallel grooves arranged to deflect a part of the light beam impinging upon the grating. Thus, when incorporated in the optical pickup apparatus of the invention to be described later, the holographic grating 3 works to turn a portion of the light beam reflected from the information carrying disc to a photodetector. It should be noted that the diffraction grating 4a and the holographic grating 3 are made of plastics or glass, and formed into the grating assembly 2 of unitary or integral structure. However, this invention is not limited to the use of plastics and glass. Other suitable materials may also be used for the unitary grating assembly.

Fabrication of the unitary grating assembly 2 will now be briefly described with reference to FIGS. 11A-11G.

Figure 11C:
FIGS. 11A-11G are schematic cross-sectional drawing illustrating successive steps for manufacturing the optical grating assembly according to this invention.
Figure 11A:
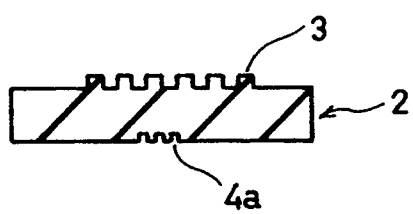
Figure 11D:
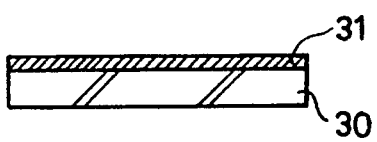

FIG. 11A illustrates the grating assembly 2 for a schematic cross-section. The grating assembly 2 has the holographic grating 3 on one face and the diffraction grating 4a on the other face. The assembly is fabricated by introducing (thermoplastic) synthetic resin material or glass into a mold 33 as illustrated in FIG. 11B. The mold 33 includes an upper molding half 33a provided with a counterpart design of the desired holographic grating, and a lower molding half 33b ruled with a complementary design of the desired diffraction grating. The mold 33 also has an inlet passage 33c formed therein, and glass or plastic material in a molten or a fluid state is introduced into the mold through the inlet passage 33c. A pool of molten material within the mold 33 is left to set into a solid body which constitutes the unitary composite grating structure 2. Other grating structures according to the invention which will be described hereinbelow are all fabricated in substantially the same manner.

The forming of the mold half 33a will be described with reference to FIGS. 11C-11G. A glass pane or a sheet of glass 30 is prepared as illustrated in FIG. 11C. A coating 31 of photoresist is applied over one surface of the glass pane 30 (FIG. 11D).

Figure 11E:
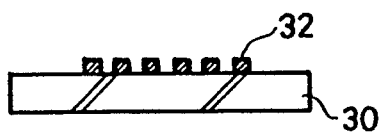
Figure 11B:
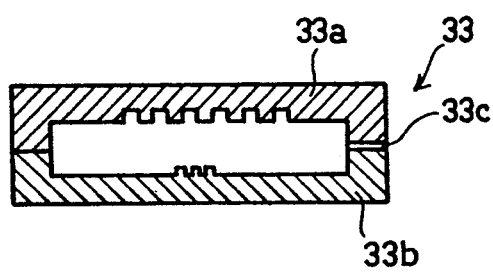
Figure 11F:
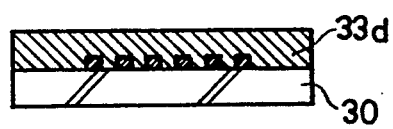
Figure 11G:

In the next step, a photolithographic technique is used (and, when necessary, a two-beam interference technique), the photoresist coating 31 is etched away to leave a pattern of fine thread-like projections 32 (FIG. 11E). The pattern of the fine projections 32 is covered with a coating of electroplated metal 33 having a desired thickness (FIG. 11f). When the electroplated metal coating 33 is stripped off the underlying glass sheet 30, the coating is incorporated into the upper mold half 33a as a grating-forming surface layer. Similarly a grating-forming layer for the lower molding half 33b can be fabricated following substantially the same process as described above.

Figure 12:
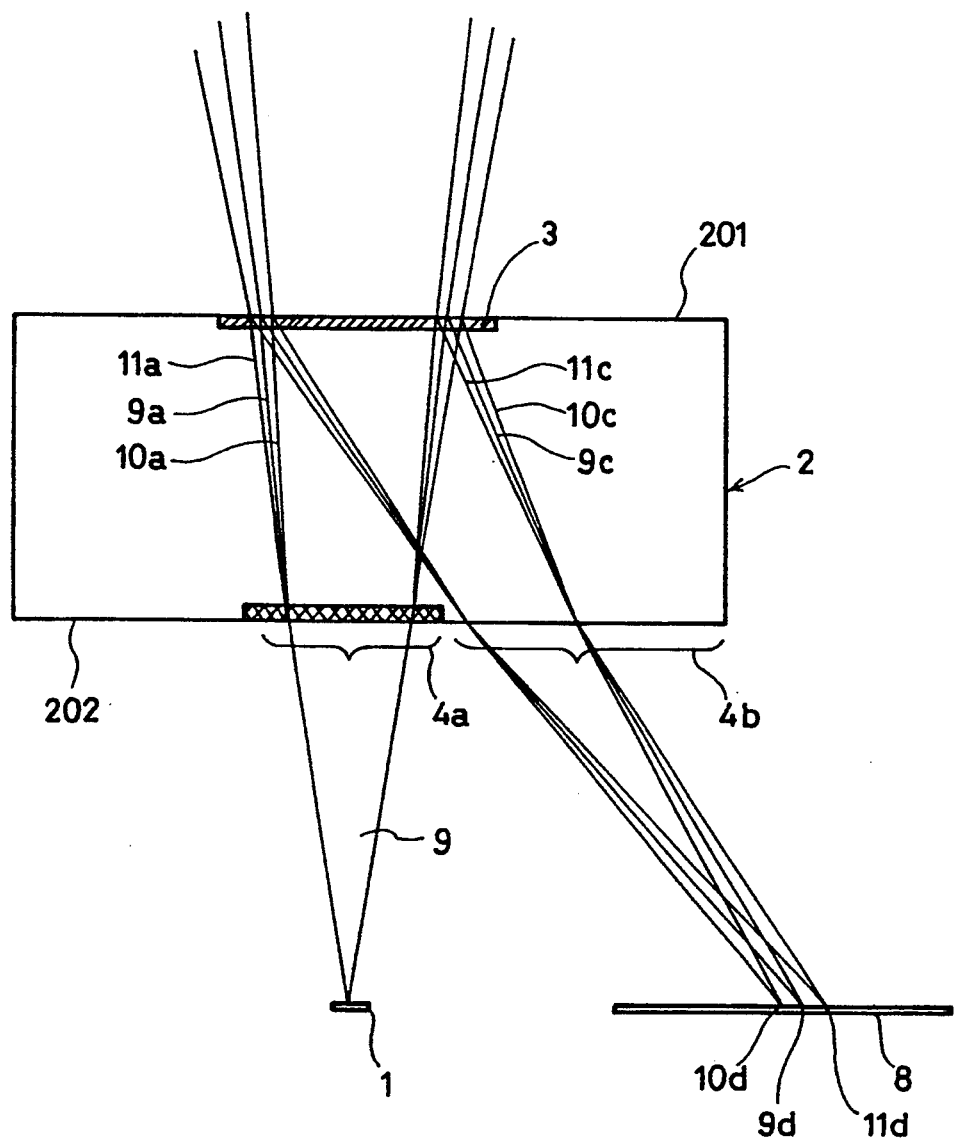
FIG. 12 is an enlarged cross-sectional view illustrating the working of the optical grating assembly of FIG. 10.

The optical working of the grating assembly 2 of FIG. 10 is illustrated in FIG. 12 by a greatly enlarged cross-section taken along the line A—A of FIG. 10. Referring to FIG. 12 together with FIG. 13 which schematically illustrates an optical pickup apparatus according to the invention and having the grating assembly 2 incorporated therein, the optical pickup apparatus includes a laser source 1, typically a semiconductor laser device, and an objective lens 6 positioned close to an information carrier disc 7 for converging the laser light from the source 1 on the disc. A collimating lens 5 is disposed closer to the objective lens, while the optical grating assembly is disposed to the laser source 1. The pickup apparatus also includes a six-segment photosensor or photodetector 8 which produces electric outputs in response to and as a function of incident light radiation.

Now to describe the operation of the illustrated pickup apparatus, a laser beam 9 emitted from the laser source 1 falls on the diffraction grating 4a provided on the face 202 of the grating assembly 2. The incident laser beam is diffracted by the diffraction grating into a zero-order diffracted beam 9a for reading the data pits on the disc 7, and a pair of first-order diffracted beams 10a and 11a for sensing tracking error of the main readout beam 9a. These three diffracted beams 9a, 10a and 11a pass through the holographic grating 3 on the other face 201 of the grating assembly 2, which diffracts the passing beams into zero-order beams and first-order beams. From these beams, only the three zero-order beams continue to the collimating lens 5. The first-order beams miss the collimating lens 5 due to their greater diffraction angles. The three beams 9a, 10a and 11a impinging on the collimating lens 5 are in a parallel as they pass therethrough and are directed to the objective lens 6, which focuses the beams into three spots 9b, 10b and 11b onto the disc 7 for reading out the information carried therein.

Figure 2:
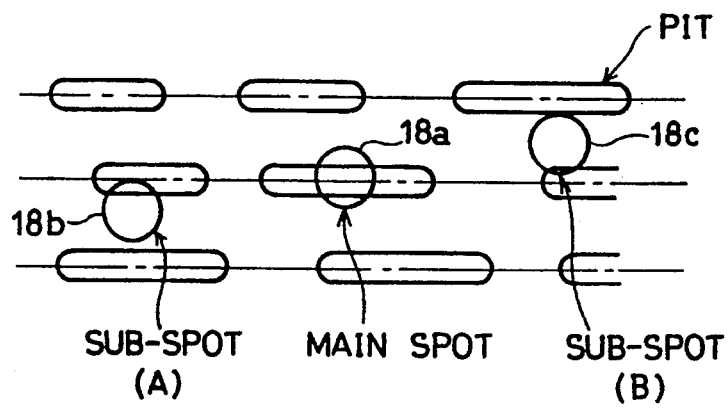
FIG. 2 is a schematic illustration helpful in understanding some basic working principles of the three-beam detection method for tracking servo control.
Figure 2:
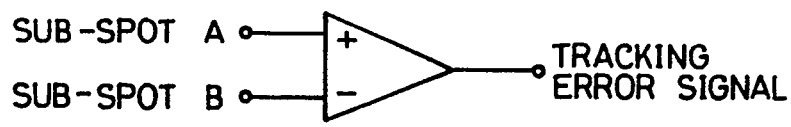
Figure 3:
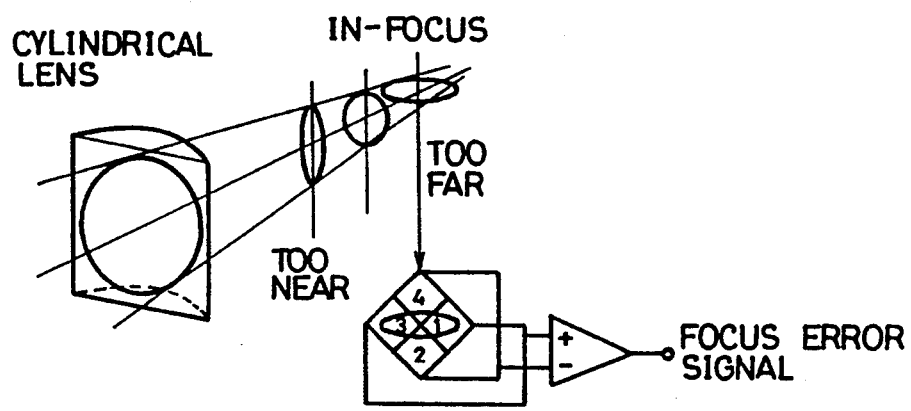
FIG. 3 is a schematic illustration helpful in understanding some basic working principles of the astigmatic detection method for focusing servo control.

The spot 9b is derived from the major laser beam 9a, whereas the spots 10b and 11b are derived from the sub-beams 10a and 11a of laser, respectively. The three beam spots are focused on the data carrying surface of the disc in a relative arrangement as illustrated in FIG. 2. Thus, the spots 10b and 11b are displaced tangentially or in a direction of the disc rotation with respect to the center spot 9b.

The spot-forming laser beams are reflected by the disc 7 and return along substantially the same optical paths through the objective lens 6 and the collimating lens 5 to the grating assembly 2 where the return beams fall on the holographic grating 3. The incident beams are then diffracted into the zero-order diffraction beams and the first-order diffraction beams. While the zero-order beams continue straight back toward the laser source 1, the first-order diffracted beams 9c, 10c and 11c are deflected sideways. As a consequence, the first-order beams 9c, 10c and 11c pass out of the grating assembly 2 through a non-grated area 4b in the lower face 202, so that the diffraction grating 4a is bypassed. It is pointed out that the first-order diffracted beams which pass obliquely through the grating assembly 2 inevitably undergo an astigmatic effect or distortion which is advantageously to produce electrical signals indicating focusing errors as will be explained later. The first-order beams 9c, 10c and 11c passing out through the non-grated area 4b impinge on the six-segment photodetector 8 and form light spots 9d, 10d and 11d, respectively, in various shapes and orientations as illustrated in FIGS. 14A–4C.

Figure 1:
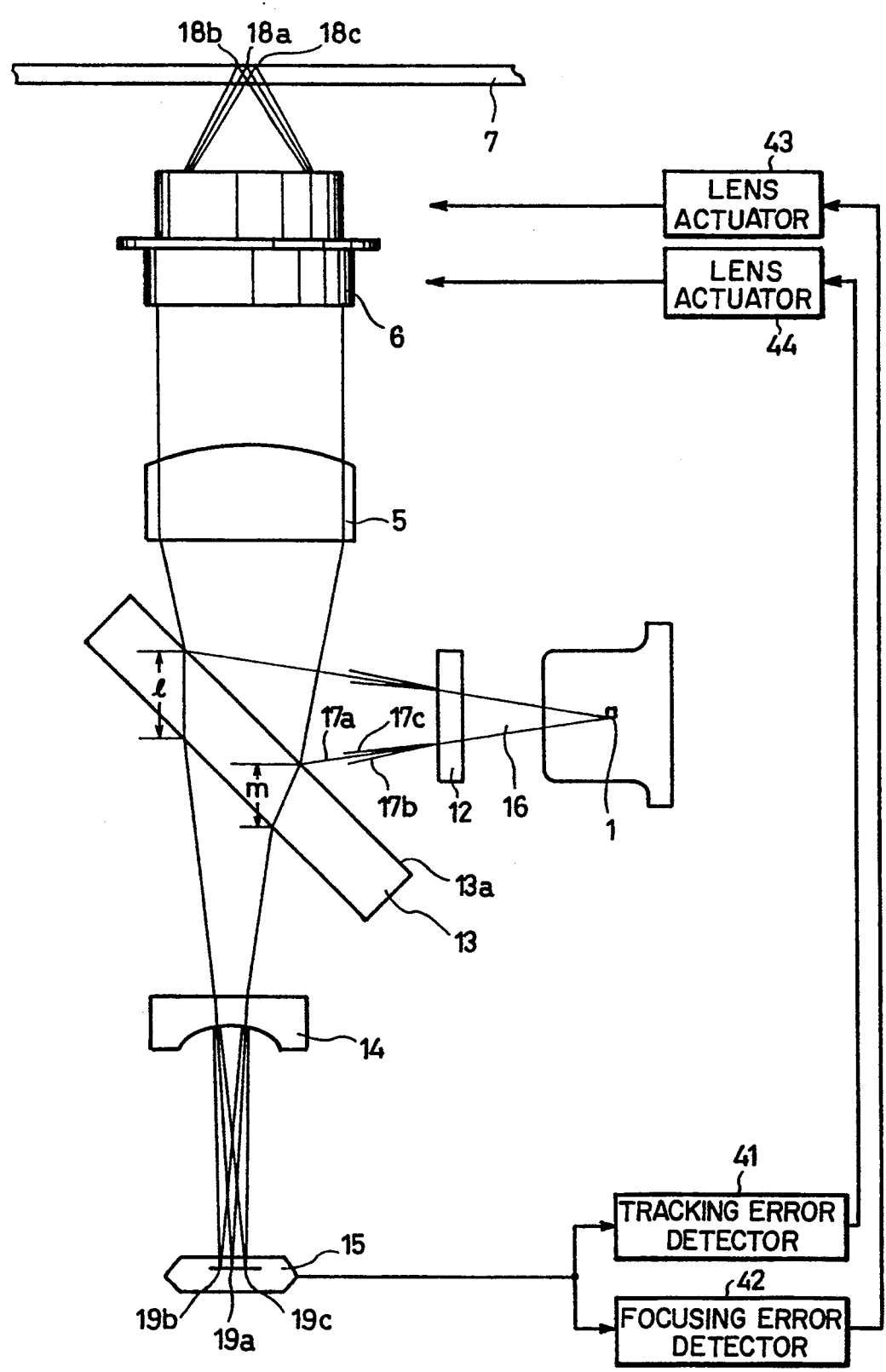
FIG. 1 is a schematic drawing illustrating showing an overall arrangement of a conventional optical pickup device.
Figure 4A:
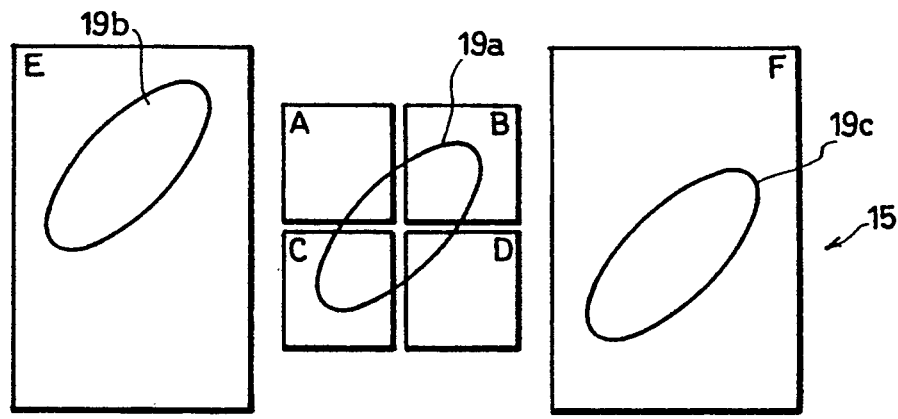
FIGS. 4A-4C are schematic drawing illustrating light spots formed in different shapes and patterns on a six-segment photodetector of a conventional optical pickup device which employs a diffraction grating.
Figure 4B:
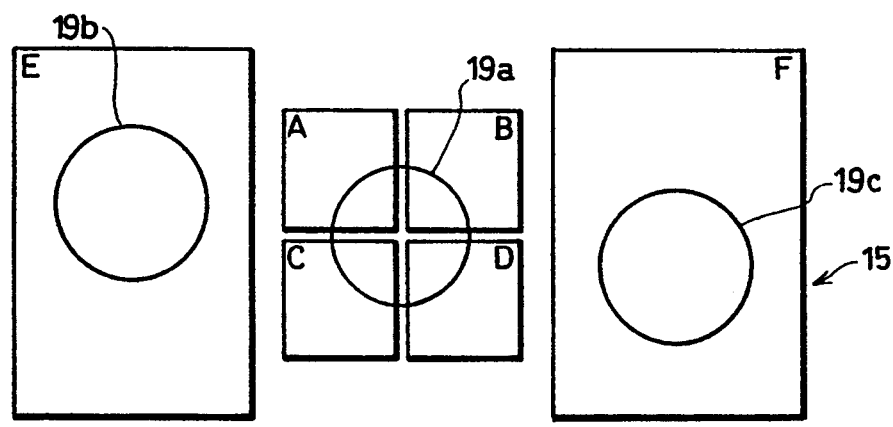
Figure 4C:
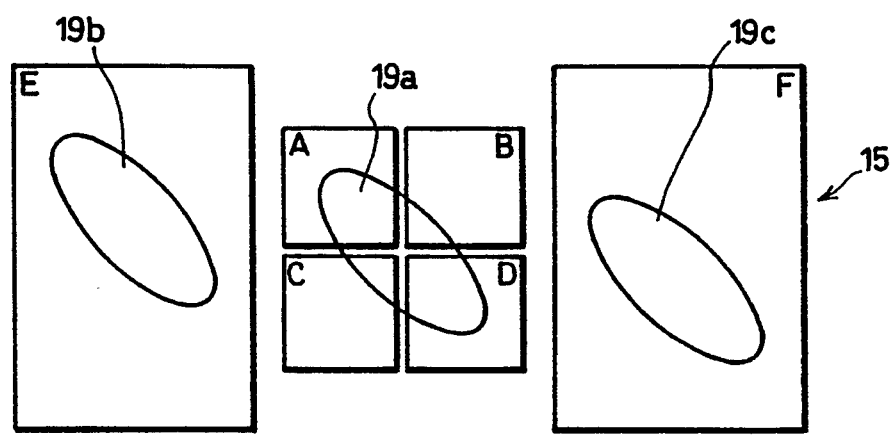
Figure 5:
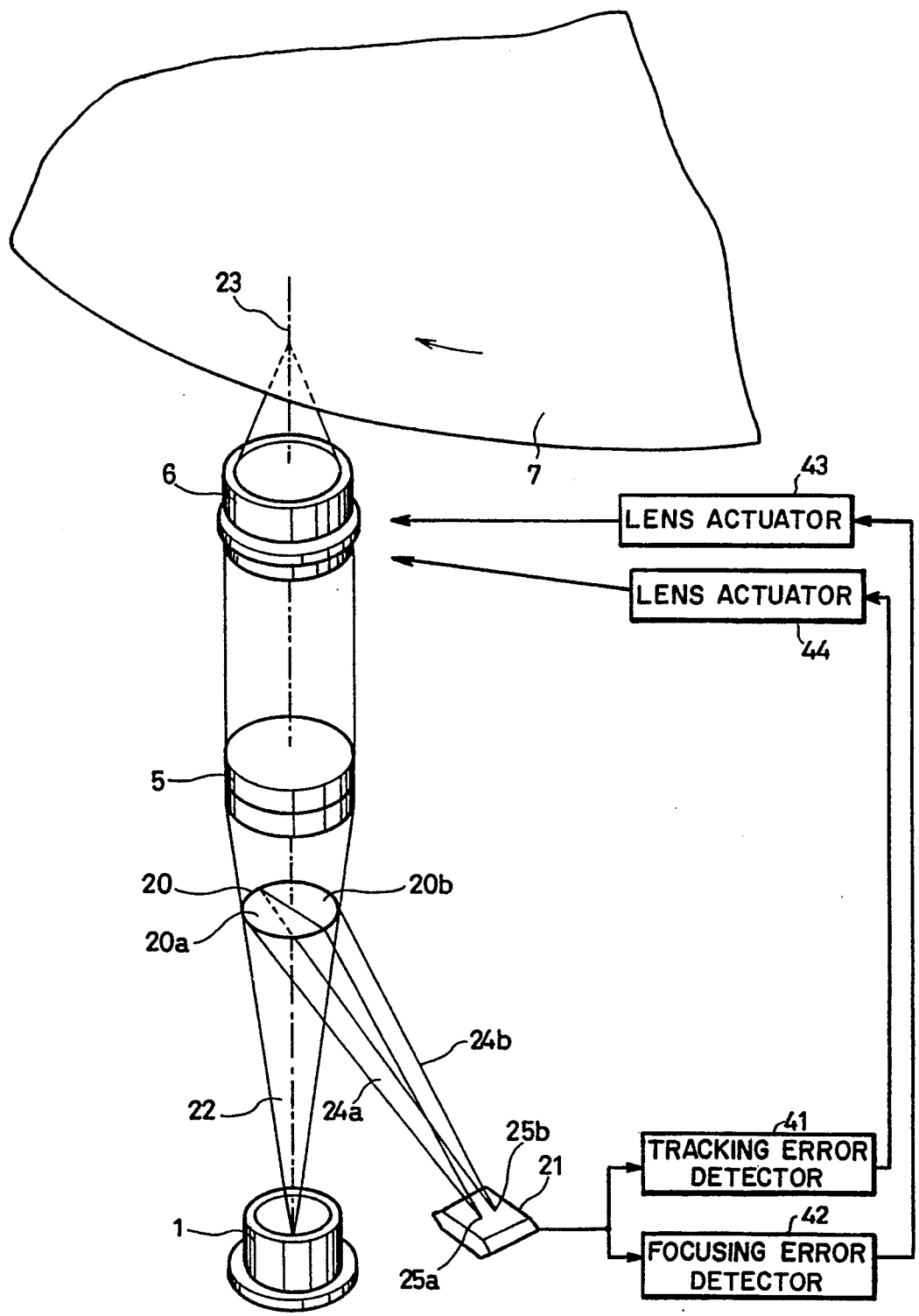
FIG. 5 is a schematic drawing illustrating an overall arrangement of a conventional optical pickup device which employs a holographic grating.
Figure 6:
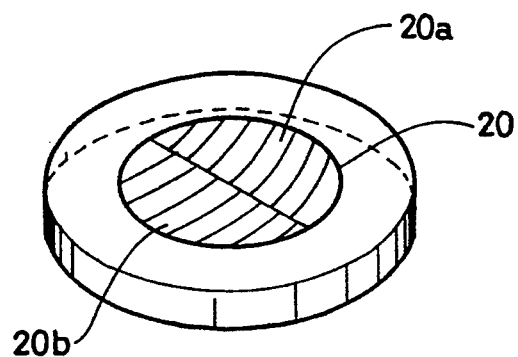
FIG. 6 is an enlarged perspective view of a holographic grating.
Figure 7:
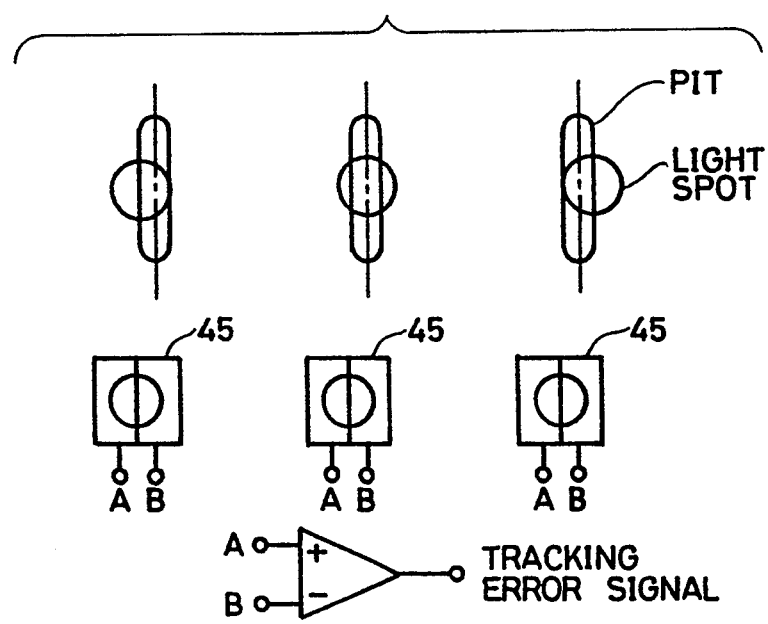
FIG. 7 is a schematic illustration helpful in understanding the basic working principle of a push-pull method.
Figure 8A:
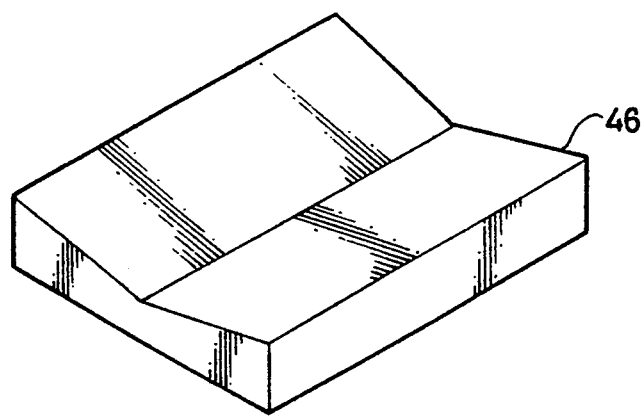
FIG. 8A is an enlarged perspective view of a typical wedge prism employed in a wedge prism method.
Figure 8B:
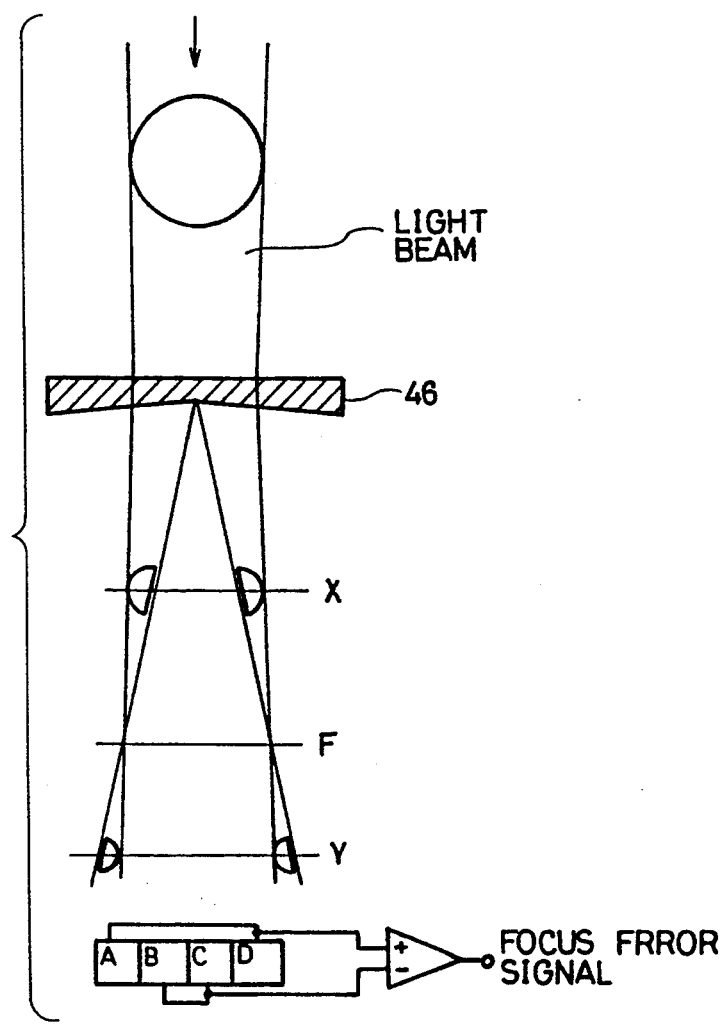
FIG. 8B is a schematic illustration helpful in understanding some basic working principle of the wedge prism method.
Figure 9A:
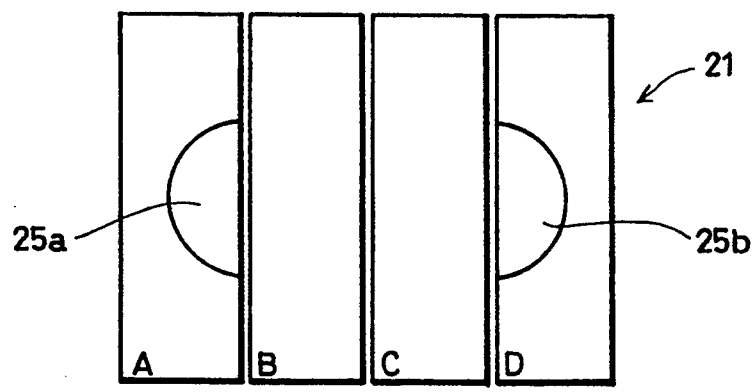
FIGS. 9A-9C are schematic drawing illustrating light spots formed in different shapes and orientations on a four-segment photodetector of a conventional optical pickup device which employs a holographic grating.
Figure 9B:
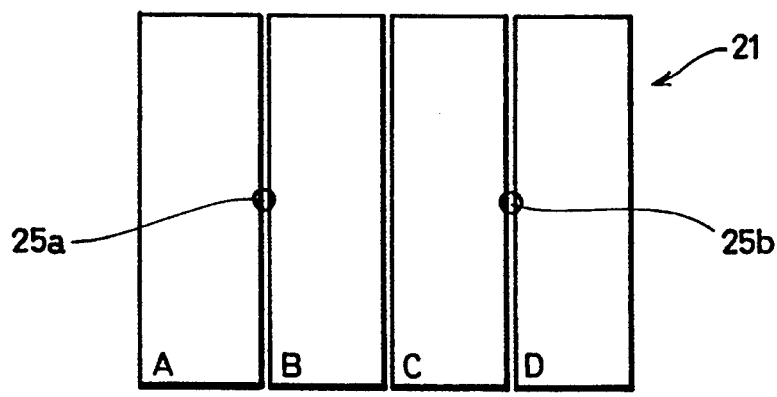
Figure 9C:
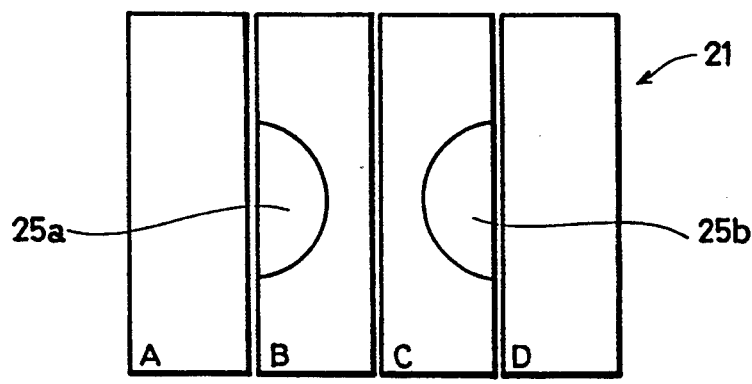

Forming of the light spots on the six-segment photodetector 8 in the pickup apparatus of the invention, both in their shapes and arrangements, is similar to the light spots formed in the conventional pickup device of FIG. 1 (see FIGS. 4A–4C). Note that the pickup device includes both the diffraction grating 12 and the plane beam splitter 13 as essential optical components.

Figure 13:
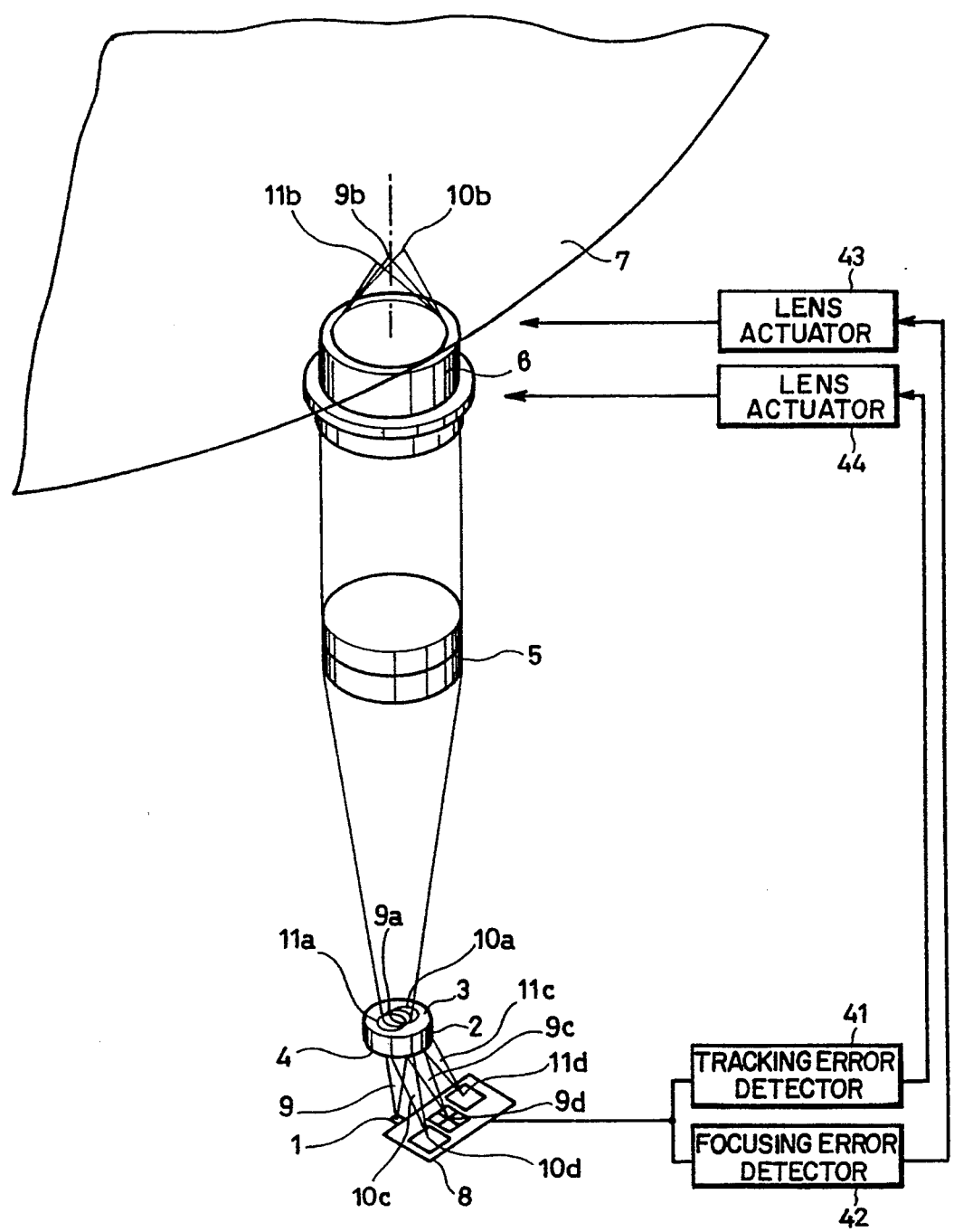
FIG. 13 is a schematic drawing illustrating the overall arrangement of an optical pickup apparatus according to this invention.

The pickup apparatus of this invention as illustrated in FIGS. 12 and 13 makes use of the three-beam detection for tracking servo control and the astigmatic detection for focusing servo control in a similar manner to the conventional device of FIG. 1. However, the pickup apparatus of the invention relies only on a single grating assembly 2 for the purpose of beam diffraction, when compared to the two optical components in the conventional device.

Figure 14A:
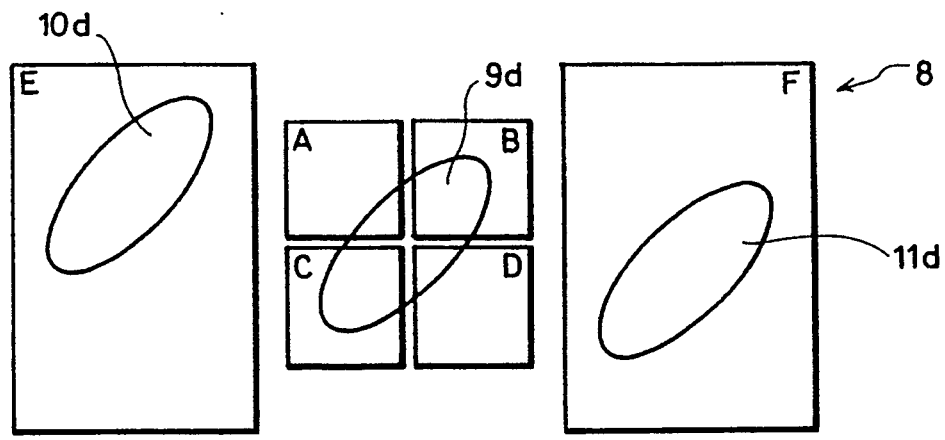
FIGS. 14A-14C are schematic drawing illustrating light spots formed in different shapes and orientations on a six-segment photodetector of the optical pickup apparatus of FIG. 13 according to this invention.
Figure 14B:
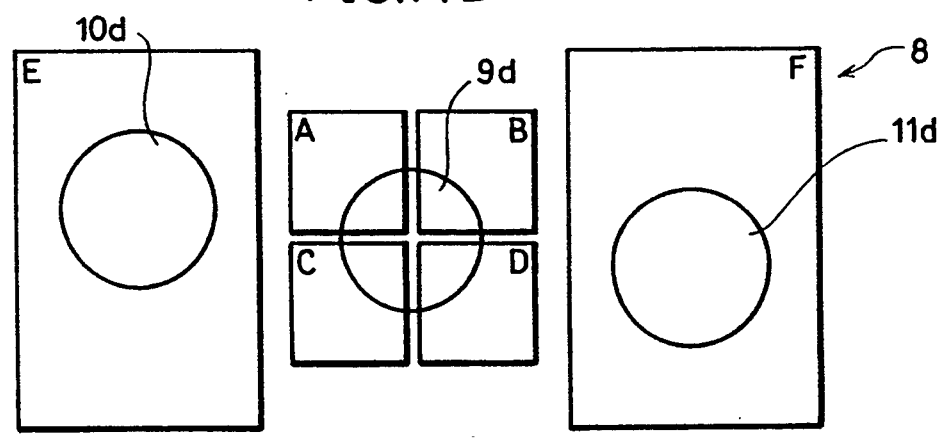
Figure 14C:
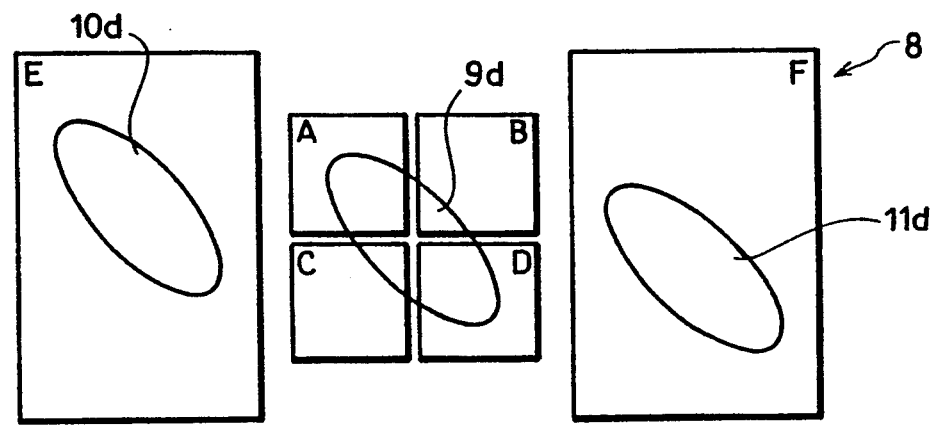

In an erroneous reading situation where the disc 7 is within the focal length of the objective lens 6 or closer to the objective lens beyond its focal point, the three spots 9d–11d are formed on the six-segment photodetector in an oblong shape and in the orientation as illustrated in FIG. 14A. In a correct reading situation where the disc 7 is in the focal plane of the objective lens 6, three circular spots 9d–11d are projected on the six-segment photodetector 8 as illustrated in FIG. 14B. In another erroneous reading situation where the disc 7 is on the far side of the focal point of the objective lens 6 or outside its focal length, the three light spots 9d–11d projected on the photodetector 8 take on oblong shapes oriented as illustrated in FIG. 14C.

A pit signal RF obtained by optically reading the data pits in the disc 7 is expressed as follows:

$$RF = a + b + c + d$$

where a, b, c and d represent electrical outputs corresponding to the amount of light received by the photosensitive segments A, B, C and D.

A tracking error signal TES provided by the three-beam method is expressed as follows:

$$TES = e - f$$

where e and f represent electrical outputs in proportion to the quantity of light received by the photosensitive segments E and F, respectively.

A focusing error signal FES provided by the astigmatic detection method is expressed as follows:

$$FES = (a + d) - (b + c).$$

Referring again to FIG. 13, when a focus error detector 42 senses a focusing error through the photodetector 8, the detector 12 operates a lens actuator 43 so that the actuator drives the objective lens 6 in a direction and an amount to correct the error. Similarly, as a tracking error detector 41 senses a tracking error through the photodetector 8, the detector 12 operates a lens actuator 44 such that the actuator moves the objective lens 6 in a direction and an amount to correct the error. An accurate and reliable reading of the data pits on the disc is attained in this manner.

Figure 15A:
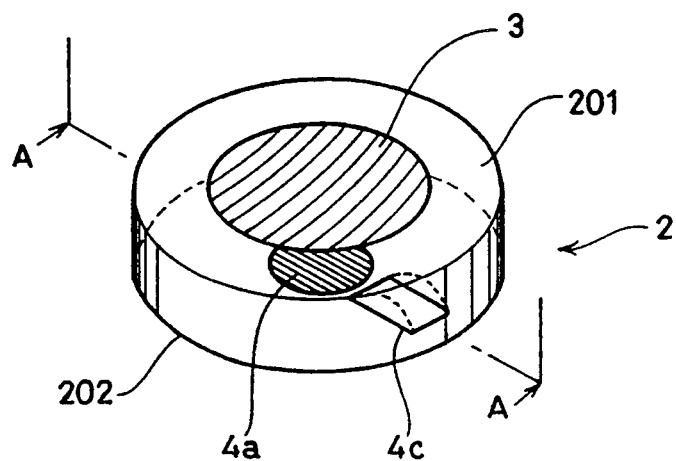
FIG. 15A is an enlarged perspective view of an optical grating assembly according to another embodiment of this invention.
Figure 15B:
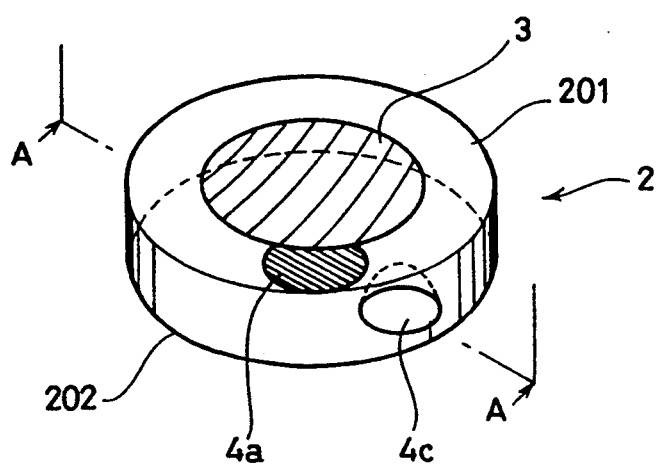
FIG. 15B is an enlarged perspective view of an optical grating assembly according to still another embodiment of this invention.

Referring to FIGS. 15A and 15B, there are illustrated optical grating assemblies according to another embodiment of the invention. The grating assemblies of FIGS. 15A and 15B are essentially identical in construction to the assemblies illustrated in FIG. 10 except for the structural feature to be described hereinbelow. Thus, like component parts are designated by like reference numerals without having any further description thereof.

The novel structural feature of the optical grating assemblies 2 illustrated in FIGS. 15A and 15B is the provision of a lens structure 4c in the lower face 202 in the area through which the laser beam deflected by the holographic grating 3 towards the photodetector passes. In the grating assembly of FIG. 15A, the lens structure 4c is provided in the form of a cylindrical lens, whereas in FIG. 15B, the lens structure 4c is in the form of a concave lens.

Figure 16:
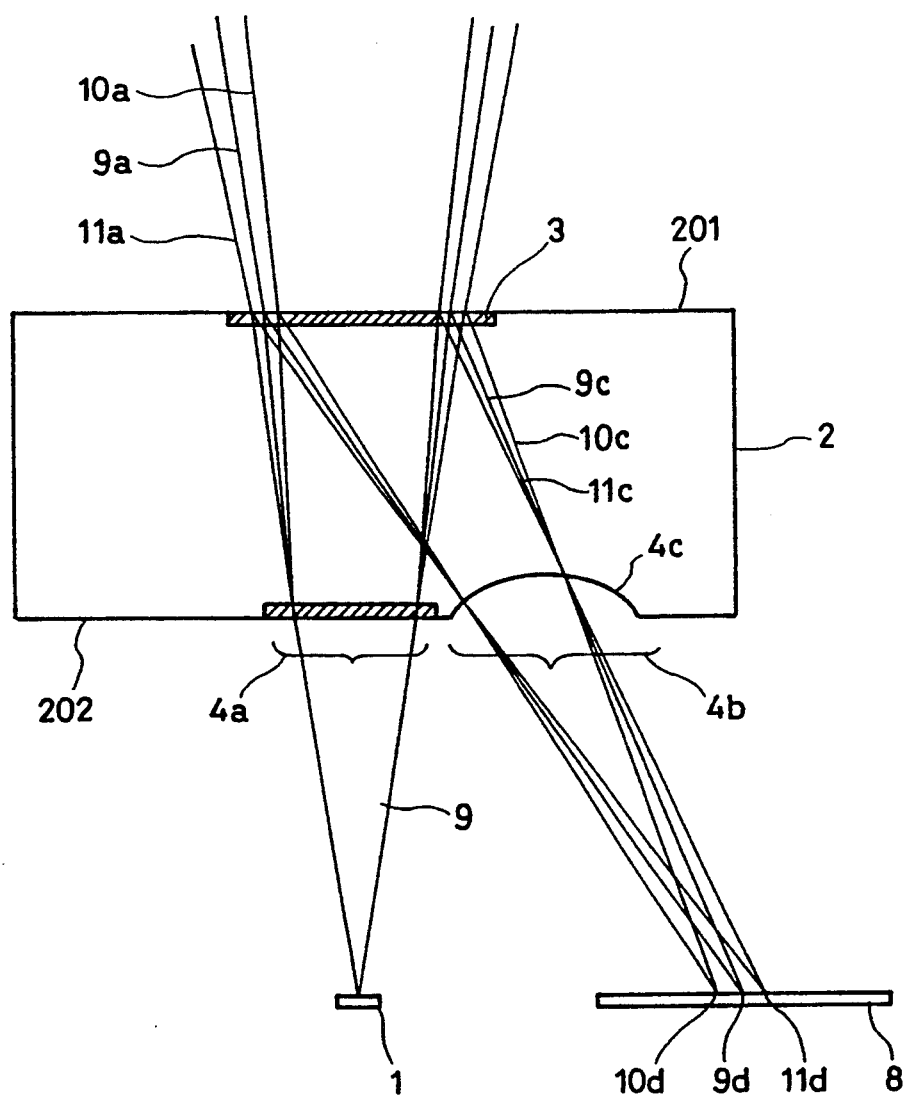
FIG. 16 is an enlarged cross-sectional view illustrating the working of the optical grating assemblies of FIGS. 15A and 15B.

The optical working of the grating assembly 2 with the lens structure 4c is illustrated in FIG. 16. With the cylindrical lens structure of FIG. 15A, the beams passing through the lens structure undergoes a greater astigmatic distortion, which, in turn, is effective to cause the photodetector to generate more distinct outputs. On the other hand, the concave lens structure 4c of FIG. 15B functions to magnify the transmitted beams in an axial or a longitudinal direction. The axially magnified beams are more readily picked up by the photodetector.

While the cylindrical lens structure 4c has been separately incorporated for enhancing the astigmatic development, the holographic grating 3 may suitably be designed to have a similar function instead of providing a separate structure 4c.

Figure 17:
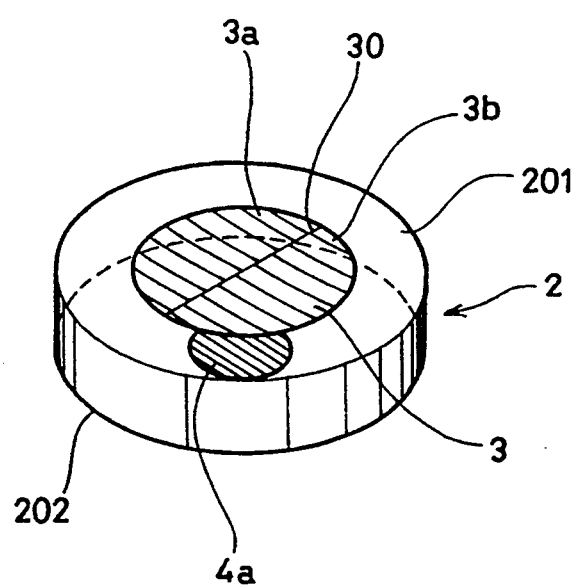
FIG. 17 is an enlarged perspective view of an optical grating assembly according to still another embodiment of this invention.

An optical grating assembly 2 according to still another embodiment of the invention is illustrated in FIG. 17. The grating assembly 2 is substantially identical in construction to the assembly of FIG. 10. Thus, similar parts are indicated by similar reference numerals. However, the grating assembly 2 of FIG. 17 differs from the assembly of FIG. 10 because the holographic grating 3 is divided into two sections 3a and 3b along a line 30 which extends in the tangential or circumferential direction of the disc 7. The dividing line 30 is added in the drawing for the purpose of indicating the boundary between the two grating sections 3a and 3b, but no such line is seen in an actual grating structure. The two-section holographic grating is fabricated following the procedure described hereinabove in connection with FIGS. 11A–11F.

Figure 18:
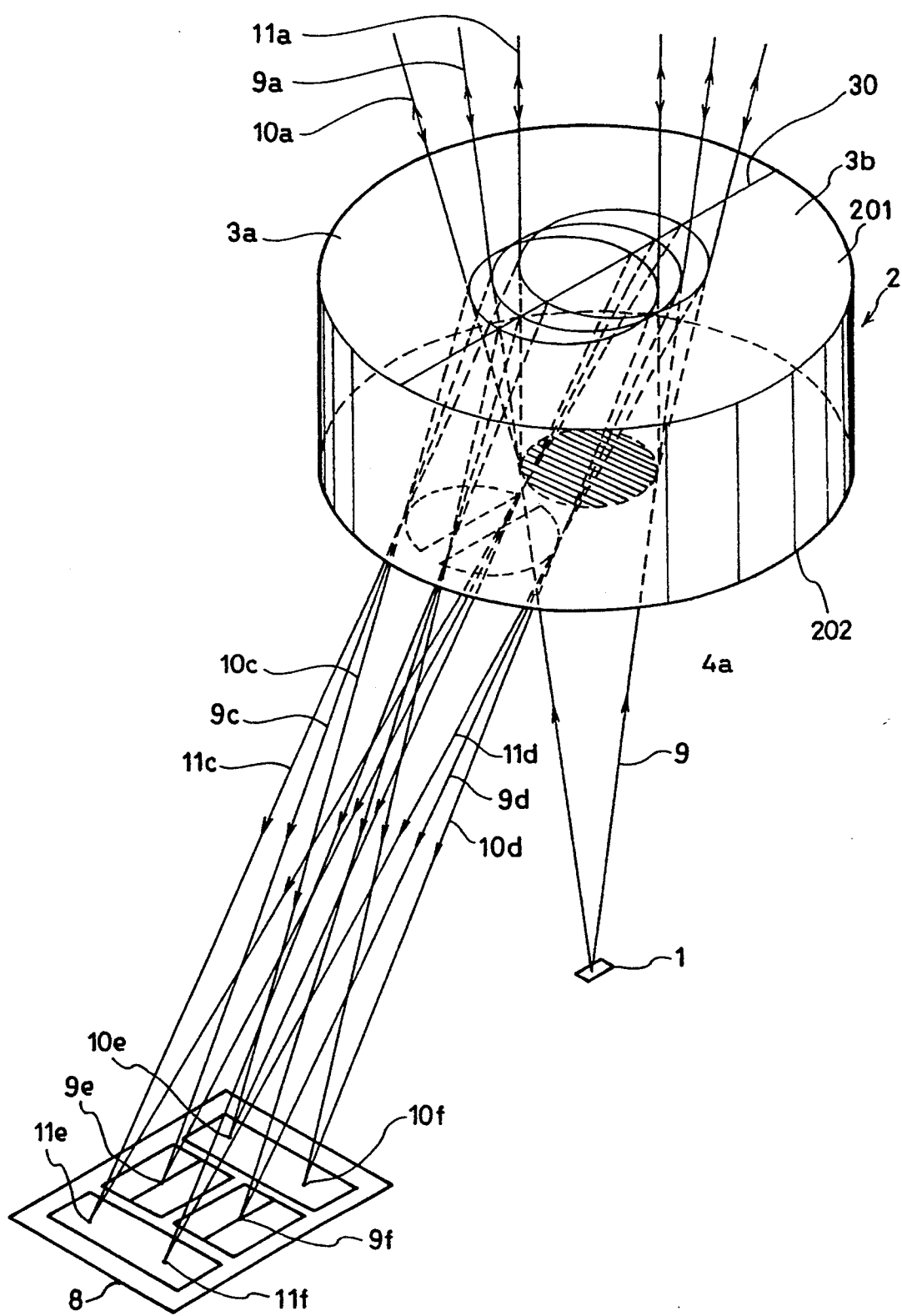
FIG. 18 is an enlarged perspective view illustrating the working of the optical grating assembly of FIG. 17.
Figure 19:
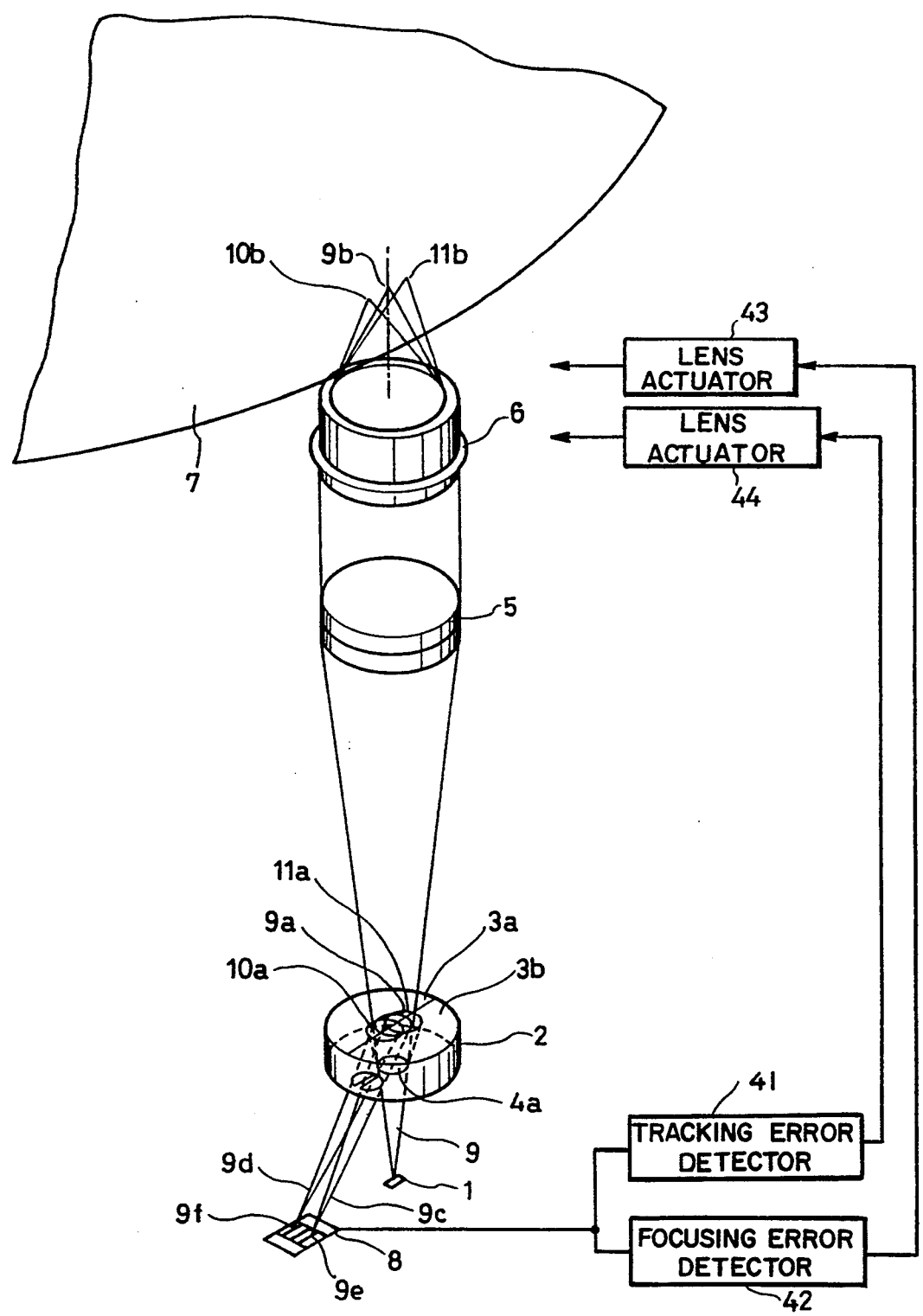
FIG. 19 is a schematic drawing illustrating the overall arrangement of an optical pickup apparatus according to this invention which employs the optical grating assembly of FIG. 18.

The operation of an optical pickup apparatus which incorporates the grating assembly 2 of FIG. 17 is now explained with reference to FIG. 19 together with FIG. 18 which illustrates the optical working of the grating assembly.

A laser beam 1 emitted from a laser source 1 impinges on a diffraction grating 4a provided in one face 202 of a grating assembly 2 where the beam diffracted into a zero-order main beam 9a for reading the data pits on a disc 7 as well as sensing focusing error, and a pair of first-order sub-beams 10a and 11a for sensing the tracking error. The beams 9a, 10a and 11a pass through holographic grating sections 3a and 3b which diffract these beams again into zero- and first-order beams. The first-order beams, being diffracted through a far greater angle, miss a collimator lens 5. Thus, only the zero-order diffracted beams of the incident beams 9a, 10a and 11a continue to the collimator lens 5 for being cast into parallel rays. The collimated beams are directed to an objective lens 6 which functions to focus the incoming beams into three spots 9b, 10b and 11b on the data recorded surface of an information disc 7. The three focused spots assume the arrangement as illustrated in FIG. 2 with the spots 10a and 11a being tangentially displaced away from the center spot 9a.

The laser beams which form the spots 9a, 10a and 11a on the disc are reflected by the data surface of the disc 7 and return along substantially the identical paths through the objective lens 6 and the collimating lens 5 to the grating assembly 2. The returning beams fall on the grating sections 3a and 3b of the holographic grating 3 which function to independently and separately diffract the transmitted beams into zero- and first-order beams. As before, the zero-order diffracted beams are directed straight back to the laser source 1.

On the other hand, the first-order beams 9c, 10c and 11c diffracted by the holographic grating section 3a, and the first-order beams 9d, 10d and 11d diffracted by the other holographic grating section 3b pass out of the grating assembly 2 through a non-grated region in the lower face 202. The holographic grating sections 3a and 3b are designed such that the outgoing first-order diffracted beams converge on different locations. Accordingly, the diffracted beams 9c, 10c and 11c through the grating section 3a fall on a six-segment photodetector 8 to form three spots 9e, 10e and 11e, while the diffracted beams 9d, 10d and 11d through the other grating section 3b impinge on the photodetector 8 to form three different spots 9f, 10f and 11f. It is noted here that the light spots 9e and 9f are derived from the main laser beam 9a, and that the light spots 10e–10f and 11e–11f come from the sub-beams 10a and 11a, respectively. With the arrangement of the pickup apparatus as illustrated in FIGS. 18 and 19, a laser beam from the source is distributed into one main beam and a pair of sub-beams by the grating assembly, and the three-beam tracking error detection is made possible. At the same time, each returning beam reflected by the disc is divided into two separate beams by the grating assembly, and the focusing error detection similar to the detection achieved by the wedge prism method is made possible.

Figure 20A:
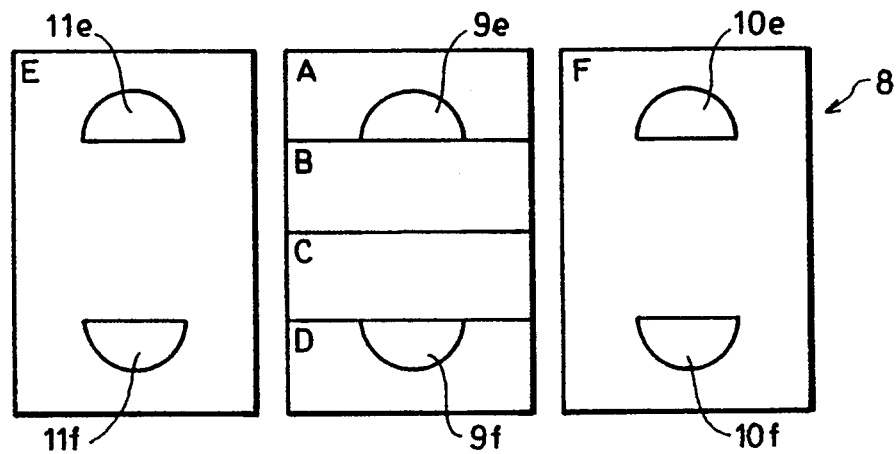
FIGS. 20A-20C are schematic drawing illustrating light spots formed in different shapes and orientations on a six-segment photodetector of the optical pickup apparatus in FIG. 19.
Figure 20B:
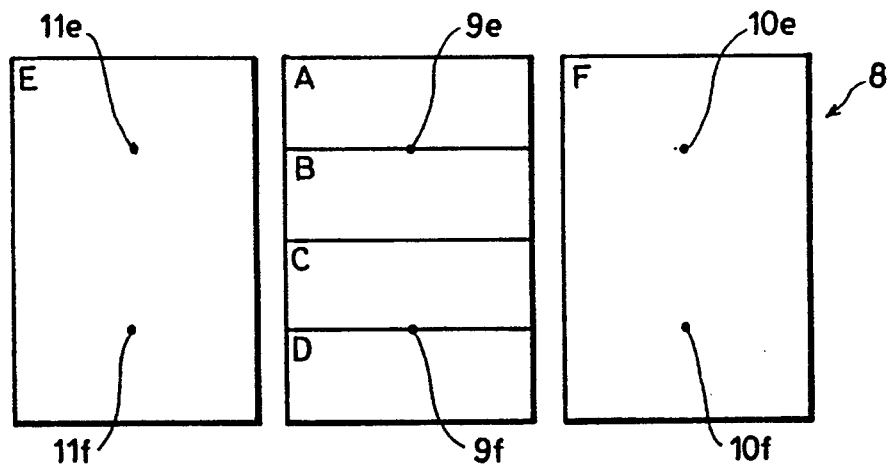
Figure 20C:
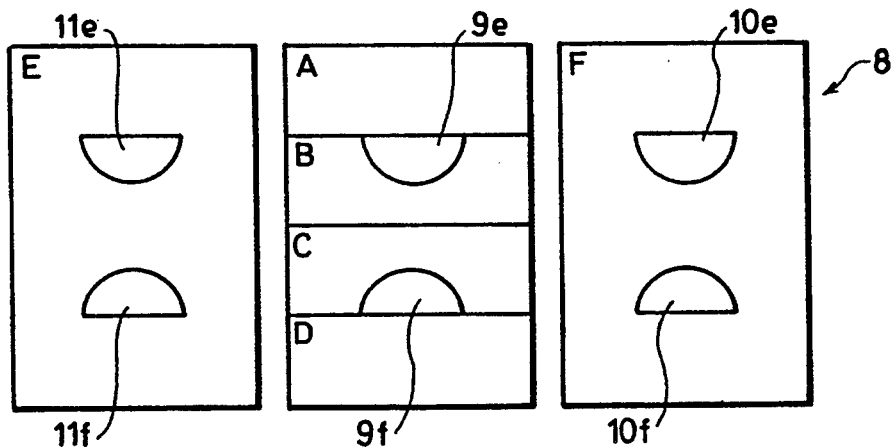

Forming the light spots on the photodetector 8 under some typical reading situations are illustrated in FIGS. 20A–20C.

In an erroneous reading situation where the information disc 7 is located off the focal point of the objective lens 6 on the near side thereof, i.e. the disc is positioned within the focal length of the objective lens, light spots 9e–11e and 9f–11f are formed on the photodetector in a semicircular shape and in an arrangement as illustrated in FIG. 20A. In a correct reading situation where the disc 7 is located on the focal point of the objective lens 6, pinpoint spots 9e–11e and 9f–11f are projected on the photodetector in a pattern as illustrated in FIG. 20B. In another erroneous reading situation where the disc 7 is located off the focal point of the objective lens on the far side thereof, i.e., the disc is positioned outside the focal length of the objective lens, semicircular light spots 9e–11e and 9f–11f are formed on the photodetector in an arrangement and an orientation as illustrated in FIG. 20C.

A pit signal RF obtained by reading the pits in the data track of the disc 7 with the read-out light spots is expressed by the following equation:

$$RF = a + b + c + d$$

where a, b, c and d represent electrical signals corresponding to the amount of light received on the photosensitive segments A, B, C and D, respectively.

A tracking error signal TES provided by the three-beam method is expressed as follows:

$$TES = e - f$$

where e and f represent electrical signals proportional to the amount of light projected and received on the photosensitive segments E and F, respectively.

A focus error signal FES generated by the wedge prism type detection is expressed as follows:

$$FES = (a + d) - (b + c).$$

Whenever a tracking error is sensed by a tracking error detector 41, a lens actuator or a driver 44 operates in response to the output signal from the detector 41 to move the objective lens 6 in a direction and an amount to correct the error. Likewise, when a focusing error is sensed by a focusing error detector 42, a lens actuator or a driver 43 operates responsive to the output signal from the detector 42 to move the objective lens 6 in a direction and quantity to correct the focusing error. In this manner, the position of the objective lens 6 relative to the disc 7 is always adjusted so that the disc surface is kept in the focal plane of the objective lens and the reading beam spots are focused right on the data track of the disc. Thereby, and reliable read-out of the pits in the data track is assured.

Figure 21:
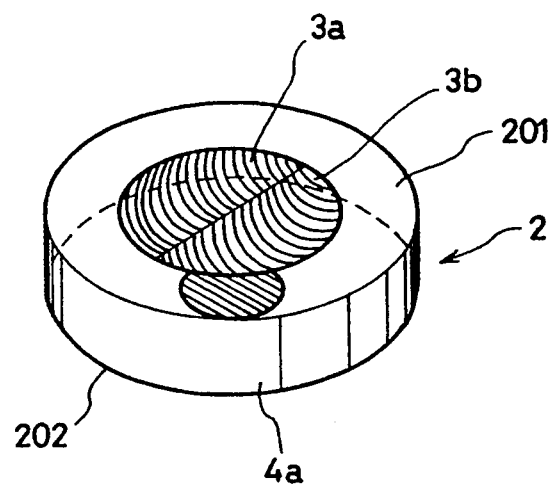
FIG. 21 is an enlarged perspective view of an optical grating assembly according to still another embodiment of this invention.

In FIG. 21, there is illustrated a grating assembly according to still another embodiment of the invention and suitable for use in ah optical pickup apparatus of the invention. The grating assembly of FIG. 21 is substantially identical in construction to the assembly illustrated in FIG. 17, and like parts are designated by like reference numerals. A distinct feature of the grating assembly 2 of FIG. 21 not found in the grating assembly of FIG. 17 is that a holographic device for relieving the influence of astigmatism is provided over the holographic grating sections 3a and 3b. The holographic grating may be made to have an additional function of relieving the influence of the coma. In FIG. 21, the provision of the anti-astigmatism holographic device is represented by drawing the grating sections 3a and 3b to have a grating configuration or a pattern different from the getting information or pattern illustrated in FIG. 17. The particular holographic device may be fabricated by a photolithographic technique which employs two-beam interference (FIG. 11E). As can be seen in FIG. 18, the returning light beams are transmitted obliquely through the grating assembly 2 toward the photodetector 8, which inevitably develops astigmatic distortion in the transmitted light beams. As a result, these beams form on the photodetector light spots of oblong circles or ellipses instead of regular circles. By providing the anti-astigmatism holographic device over the holographic grating sections 3a and 3b, the development of astigmatic effects on the light beams transmitted through the grating assembly 2 is prevented. Thereby, the formation of fully round light spots on the photodetector result.

It is also possible to design the holographic grating to have-an image magnifying function for enlarging the light spots formed on the photodetector. With the enlarged light spots, the photodetector works to generate electrical outputs of a greater intensity.

Figure 22:
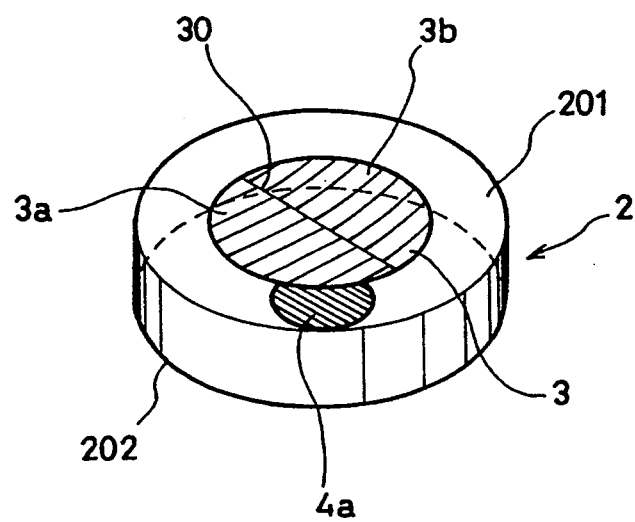
FIG. 22 is an enlarged perspective view of an optical grating assembly according to still another embodiment of this invention.

There is illustrated in FIG. 22 an optical grating assembly 2 according to still another embodiment of the invention, which is essentially identical in structure to the assembly illustrated in FIG. 17. Thus, like component parts are designated by like reference numerals.

In contrast to the grating assembly of FIG. 17, the grating assembly 2 of FIG. 22 has been divided into two holographic grating sections 3a and 3b along a line 30 which extends parallel to the fine grooves in the diffraction grating 4a on the other face 202 of the assembly 2. When the dividing line 30 extends orthogonally with respect to the grated grooves, the following problems arise.

Turning back to FIG. 18, the wavelength of the laser beam 9 emitted by the semiconductor source 1 undergoes a very slight change corresponding varying temperatures. As the wavelength of the emanating laser beam changes, so does the return beam reflected by the disc 7. The relation expressed by the following equation exists between the wavelength λ of the reflected beam and the diffraction angle Θ through which the reflected beam is diffracted into the first-order beam:

$$\sin \Theta = \frac{\lambda}{d}$$

where d denotes the pitch spacing of the holographic grating.

As will be seen from the equation, any variation in the wavelength of the light beam causes a change in the diffraction angle Θ. If the diffraction angle with respect to the first-order diffracted beam undergoes fluctuation responsive to the varying wavelength λ, the light spots 9e–11e and 9f–11f focused on the photodetector 8 are displaced laterally in the direction toward or away from the source 1 as illustrated in FIG. 18. As a result, the spots 9e–11e are positioned much closer to one another, making it difficult to obtain clear and distinct RF signals, tracking error signals and focusing error signals. This is true of the light spots 9f–11f.

In order to make allowance for the possible fluctuation in the wavelength of the laser beam caused by varying temperature conditions or different semiconductor devices used as the laser source 1, it has been necessary to design the optical system of the pickup apparatus such that the light spots 10e and 10f are displaced on the photodetector 8, as much as possible, away from the light spots 11e and 11f, respectively. To this end, the beams 10b and 11b on the disc 7 must be made to lie farthest apart from each other, or alternatively additional optical component parts should be incorporated. These propositions are disadvantageous because they impose stringent requirements on the mounting accuracy of the whole apparatus, and also involve higher manufacturing costs and lower operating stability.

Figure 23:
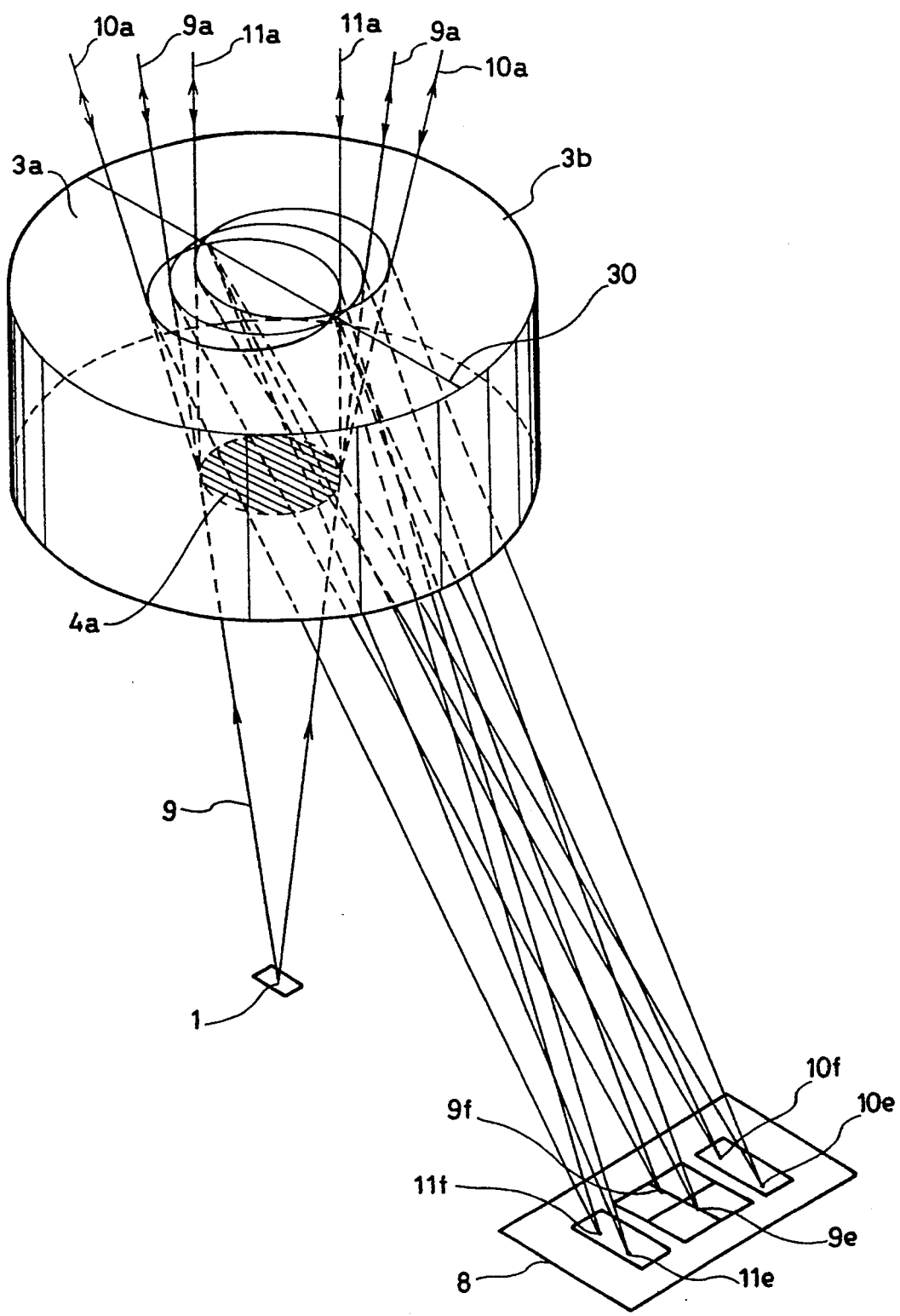
FIG. 23 is an enlarged perspective view illustrating the working of the optical grating assembly of FIG. 22.
Figure 24:
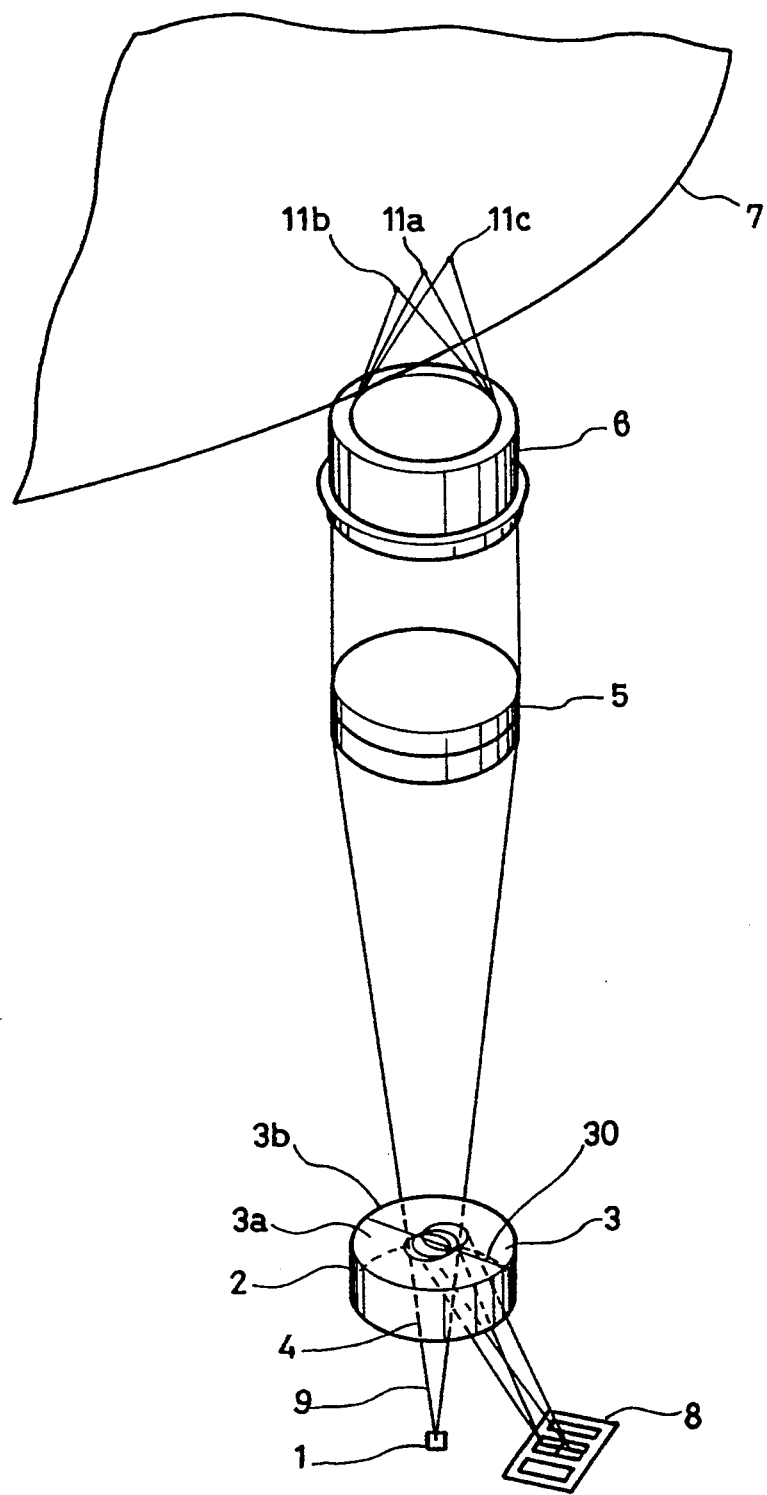
FIG. 24 is a schematic drawing illustrating the overall arrangement of an optical pickup apparatus according to this invention which employs the optical grating assembly of FIG. 24.

The aforementioned problems relating to the fluctuating wavelength of the laser beam is effectively overcome by the novel grating assembly 2 of FIG. 22 in which the holographic grating 3 is divided into the grating sections 3a and 3b along the line 30 extending parallel to the fine grooves or slits of the diffraction grating 4a. FIG. 23, which illustrates the optical working of the grating assembly 2 of FIG. 22 is and FIG. 24, which illustrates an optical pickup apparatus employing the grating assembly of FIG. 22, are referred to next. As the wavelength of the laser beam 9 from the source 1 fluctuates, the light spots focused on the photodetector 8 are displaced laterally in a direction away or toward the laser source 1. However, neither the spacing between the light spot 10e and 11e nor is the distance between the spots 10f and 11f are diminished. Hence, it is not necessary to set the spacing between the light spots 10e and 11e, and the spacing between the light spots 10f and 11f broader than usual in anticipation of possible shrinking.

Fluctuations of the spacing between the spots 10e and 10f, and the spacing between the spots 11e and 11f in the direction toward or away from the laser source 1 are effectively compensated by adjusting the pitch of the grating grooves in the grating sections 3a and 3b.

As has been described in detail hereinabove, the optical pickup apparatus of the invention includes the diffraction grating which distributes a light beam from a source into a main beam for reading the data pits on the information carrier disc, and a pair of sub-beams for sensing tracking error of the main reading beam. The diffraction grating ensures a generation of stable tracking error signals. The pickup apparatus also includes a holographic grating for directing and converging part of the light beam reflected by the disc onto the photodetector. The holographic grating is integrally formed with the diffraction grating into a unitary grating assembly, which eliminates the need for two separate grating components. A reduction of the requisite grating components leads to a reduction of assignments of delicate operational adjustments. The overall result is the provision of an inexpensive optical pickup apparatus which possesses an excellent ability to sense the tracking error of the read-out beam.

Further, in the novel grating assembly of the invention, the diffraction grating for diffracting the beam from the source into zero- and first-order beams, and the holographic grating for orienting part of the light beams reflected by the disc toward the photodetector are formed integral with each other. This unitary structure makes it possible to fabricate both the diffraction grating and the holographic grating simultaneously in an economical manner as illustrated in FIG. 11B. The unitary grating assembly also makes putting component parts together into a pickup apparatus easier and less troublesome.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup apparatus for reading data pits held in a disc by converging a light beam from a light source into a light spot on said disc and directing light reflected by said disc to a photodetector for producing a tracking error signal, comprising:
   first grating means for distributing the light beam from said light source into a main beam for reading said data pits on said disc and a pair of sub-beams for sensing a tracking error of said main beam;
   second grating means for orienting a portion of the light reflected by said disc to said photodetector; and
   an optical grating assembly having a first surface portion facing said light source with said first grating means provided thereon and a second surface portion facing said disc with said second grating means provided thereon.

2. An optical pickup apparatus according to claim 1, further comprising means for developing focusing error signals from an astigmatic detection of said oriented beam detected by said photodetector.

3. An optical pickup apparatus according to claim 1, further comprising means for developing focusing error signals from a wedge prism detection of said oriented beam from said grating assembly detected by said photodetector.

4. An optical pickup apparatus according to claim 1, wherein said first grating means comprises a diffraction grating.

5. An optical pickup apparatus according to claim 1, wherein said second grating means comprises a holographic grating.

6. An optical pickup apparatus according to claim 1, wherein said optical grating assembly comprises glass.

7. An optical pickup apparatus according to claim 1, wherein said optical grating assembly comprises plastic.

8. An optical pickup apparatus according to claim 1, wherein said optical grating assembly includes lens means for enhancing astigmatism in said first surface portion in an area which has the light oriented by said second grating means to said photodetector pass therethrough.

9. An optical pickup apparatus according to claim 8, wherein said lens means for enhancing astigmatism comprises a cylindrical lens surface.

10. An optical pickup apparatus according to claim 1, wherein said optical grating assembly comprises lens means for magnifying light spots in said first surface portion in an area which has the light oriented by said second grating means to said photodetector pass therethrough.

11. An optical pickup apparatus according to claim 10, wherein said lens means for magnifying said light spots comprises a concave lens surface.

12. An optical pickup apparatus according to claim 5, wherein said holographic grating is divided into two sections for developing focusing error signals by a wedge prism detection of said oriented beam from said grating assembly detected by said photodetector.

13. An optical pickup apparatus according to claim 5, wherein said holographic grating relieves an astigmatism influence and a coma influence in the light reflected by said disc and transmitted through said grating assembly.

14. An optical pickup apparatus according to claim 5, wherein said holographic grating magnifies the light spots formed on said photodetector.

15. An optical pickup apparatus according to claim 5, wherein said holographic grating enhances astigmatism in the light reflected by said disc and transmitted through said grating assembly.

16. An optical pickup apparatus according to claim 12, wherein said holographic grating is divided into two sections along a line which extends parallel to grating lines of said diffraction grating provided in said first surfaces portion of said grating assembly.

17. An optical grating assembly to be disposed between a light source and an information carrying disc for orienting a portion of the light reflected by the disc to a photodetector comprising:
   a first surface portion facing said light source;
   a second surface portion facing said information carrying disc;
   first grating means provided on said first surface portion for diffracting a light beam from said light source into a zero-order beam and a pair of first order beams; and
   second grating means provided on said second surface portion for orienting the portion of the light reflected by said disc to said photodetector.

18. An optical grating assembly according to claim 17, wherein said first grating means comprises a diffraction grating.

19. An optical grating assembly according to claim 17, wherein said second grating means comprises a holographic grating.

20. An optical grating assembly according to claim 17, wherein said optical grating assembly comprises glass.

21. An optical grating assembly according to claim 17, wherein said optical grating assembly comprises plastic.

22. An optical grating assembly according to claim 17, wherein said lens means for enhancing astigmatism is provided in said first surface portion in an area which has the light oriented by said second grating means to said photodetector pass therethrough.

23. An optical grating assembly according to claim 22, wherein said lens means for enhancing astigmatism comprises a cylindrical lens surface.

24. An optical grating assembly according to claim 17, further comprising lens means for magnifying the light spots formed on said photodetector provided in said first surface portion in an area which has the light oriented by said second grating means to said photodetector pass therethrough.

25. An optical grating assembly according to claim 24, wherein said lens means for magnifying the light spots comprises a concave lens surface.

26. An optical grating assembly according to claim 19, wherein said holographic grating is divided into two sections for dividing the light reflected by said disc which impinge on said holographic grating in two first-order diffracted beams.

27. An optical grating assembly according to claim 19, wherein said holographic grating an astigmation influence and a coma influence in the light reflected by said disc and transmitted through said holographic grating.

28. An optical grating assembly according to claim 19, wherein said holographic grating magnifies the light spots formed on said photodetector.

29. An optical grating assembly according to claim 19, wherein said holographic grating has an enhances astigmatism in the light reflected by said disc and transmitted through said holographic grating.

30. An optical grating assembly according to claim 26, wherein said holographic grating is divided into two sections along a line which extends parallel to grating lines of said diffraction grating provided in said first surface portion of said optical grating assembly.

31. A method for reading data pits held in a disc by converging a light beam from a light source into a light spot on said disc and directing light reflected by said disc to a photodetector for producing a tracking error signal, comprising the steps of:
distributing the light beam from said light source into a main beam for reading said data pits on said disc and a pair of sub-beams for sensing a tracking error of said main beam by first grating means; and
orienting a portion of the light reflected by said disc to said photodetector by second grating means, wherein said first grating means and said second grating means are integrally formed in an optical grating assembly having a first surface portion facing said light source with said first grating means provided thereon and a second surface portion facing said disc with said second grating means provided thereon.

32. A method according to claim 31, further comprising the steps of:
detecting said oriented beam by said photodetector;
performing an astigmatic detection of said oriented beam detected by said photodetector; and
developing focusing error signals of said astigmatic detection of said oriented beam.

33. A method according to claim 31, comprising the steps of:
detecting said oriented beam by said photodetector;
performing a wedge prism detection of said oriented beam detected by said photodetector; and
developing focusing error signals of said astigmatic detection of said oriented beam.

34. An apparatus for optically reading a radiation reflecting information plane, comprising:
a radiation source supplying a scanning beam irradiating the information plane;
a first diffraction grating disposed intermediate between said radiation source and the radiation reflecting information plane and separating the scanning beam into a main beam for reading information from said radiation reflecting information plane and a pair of sub-beams for sensing tracking error of said main beam;
said radiation reflecting information plane reflecting and modulating said main beams and sub-beams to produce a modulated main beam and sub-beams;
a radiation detector for reading at least a portion of said modulated main beam and said modulated sub-beams to recover information recorded on said information plane and provide tracking information; and
a second diffraction grating also disposed intermediate between said radiation source and the reflecting information plane for directing at least a portion of both said modulated main beam and pair of modulated sub-beams to said radiation detector.

35. The apparatus of claim 34 wherein said first and second diffraction gratings have grating lines which are substantially orthogonal to each other.

36. The apparatus of claim 34 wherein said second diffraction grating is a holographic grating.

37. The apparatus of claim 34 wherein said radiation detector includes a four quadrant detector for recovering said main beam and a pair of sub-beam detectors for providing tracking information according to the three beam method.

38. The apparatus of claim 37 wherein said four quadrant detector recovers said information from said main beam and provides focusing information according to the astigmatic method.

39. The apparatus of claim 35 wherein said holographic grating is disposed intermediate said first diffraction grating and said radiation reflecting information plane.

40. The apparatus of claim 37 further comprising astigmatic distortion enhancement means, disposed intermediate said second diffraction grating and said radiation detector, for increasing astigmatic distortion in said modulated main beam to improve focusing performance.

41. The apparatus of claim 40 wherein said astigmatic distortion enhancement means is a cylindrical lens.

42. The apparatus of claim 40 wherein said astigmatic distortion enhancement means is a concave lens.

43. The apparatus of claim 34 further comprising means for focusing at least said main beam on said radiation reflecting information plane;
said second diffraction grating and radiation detector being included in focus control means for controlling said means for focusing using a wedge prism method to focus said main beam on said radiation reflecting information plane.

44. The apparatus of claim 43 wherein said second diffraction is divided into two grating portions,
said focus control means generating focusing error signals supplied to said focus means for controlling focusing thereof.

45. The apparatus of claim 36 wherein said holographic grating is divided into two grating portions;
said holographic grating and radiation detector being included in focus control means for controlling said means for focusing using a wedge prism method to focus said main beam on said radiation reflecting information plane.

46. The apparatus of claim 45 wherein said focus control means generates focusing error signals supplied to said focus means for controlling focusing thereof.

47. The apparatus of claim 37 wherein said second diffraction grating is divided into two grating portions;
said second diffraction grating and radiation detector being included in focus control means for controlling said means for focusing using a wedge prism method to focus said main beam on said radiation reflecting information plane.

48. The apparatus of claim 34 wherein said second diffraction grating is divided into two grating portions along a dividing line;

said radiation source, first and second diffraction gratings, and irradiated portion of said information plane being aligned along an optical axis;

said first grating portion directing at least a portion of both said modulated main beam and pair of modulated sub-beams to at least a portion of said radiation detector disposed away from said optical axis.

49. The apparatus of claim 48 wherein both said first and second grating portions direct at least a portion of both said modulated main beam and pair of modulated sub-beams away from said optical axis.

50. The apparatus of claim 48 wherein the portion of said radiation detector disposed away from said optical axis and receiving the portion of said modulated main beam and modulated sub-beams from said first grating portion including first and second detector elements.

51. The apparatus of claim 34 wherein the portion of said information plane irradiated by said main beam and sub-beams moves relative to said beams along an information track;

wherein said second diffraction grating is divided into two grating portions along a line that extends in a substantially tangential direction to the information track;

said first and second diffraction gratings having grating lines extending substantially perpendicular with respect to the information track.

52. The apparatus of claim 51 wherein said radiation detector includes first and second adjacently disposed detector pairs for recovering said modulated main beam and a pair of sub-beam detectors for providing tracking information according to the three beam method;

said two grating portions of said second diffraction grating each directing a portion of said modulated main beam to a corresponding first or second detector pair.

53. The apparatus of claim 52 wherein said radiation detector is offset with respect to said radiation source perpendicularly with respect to said information track.

54. The apparatus of claim 52 wherein said grating lines of said two grating portions of said second diffraction grating are curved to reduce optical aberration.

55. The apparatus of claim 34 wherein the portion of said information plane irradiated by said main beam and sub-beams moves relative to said beams along an information track;

said second diffraction grating being divided into two grating portions along a line that extends perpendicularly with respect to the information track;

said second diffraction gratings having grating lines extending substantially perpendicularly with respect to the information track to thereby compensate for fluctuations in the wavelength of the radiation source while the grating lines of said first diffraction grating extend substantially perpendicularly with respect to the information track.

56. The apparatus of claim 55 wherein said radiation detector includes detector pairs for recovering said modulated main beam and a pair of sub-beam detectors for providing tracking information according to the three beam method;

said two grating portions of said second diffraction grating each directing a portion of said modulated main beam to a corresponding first or second detector pair.

57. The apparatus of claim 56 wherein said radiation detector is offset with respect to said radiation source perpendicular with respect to said information track, one of said detector pairs being intermediate between said radiation source and the other said detector pair.

58. A method of optically reading a radiation reflecting information plane, comprising:

supplying a scanning beam irradiating the information plane;

providing a first diffraction grating intermediate between said radiation source and said radiation reflecting information plane;

diffracting the scanning beam with said first diffraction grating into a main beam for reading information from said radiation reflecting information plane and a pair of sub-beams for sensing tracking error of said main beam;

said radiation reflecting information plane reflecting and modulating said main beams and sub-beams to produce a modulated main beam and modulated sub-beams;

providing a second diffraction grating intermediate between said radiation source and said radiation reflecting information plane;

providing a radiation detector outside the path of said scanning beam;

directing at least a portion of both said modulated main beam and pair of modulated sub-beams with said second diffraction grating to said radiation detector;

reading at least a portion of said modulated main beam and said modulated sub-beams with said radiation detector to recover information recorded on said information plane and provide tracking information.

59. The method of claim 58 further comprising focusing at least said main beam on said radiation reflecting information plane;

said steps of directing and reading forming at least parts of a step of using a wedge prism method to produce focusing information to enable said step of focusing said main beam on said radiation reflecting information plane.

60. The method of claim 59 further comprising dividing said second diffraction into two grating portions to enable said step of using said two beam method.

61. The method of claim 58 wherein said second diffraction grating is divided into two grating portions along a dividing line;

said radiation source, first and second diffraction gratings, and irradiated portion of said information plane being aligned along an optical axis;

said step of directing using one said grating portion and directing at least a portion of both said modulated main beam and pair of modulated sub-beams to at least a portion of said radiation detector disposed away from said optical axis.

62. The method of claim 61 wherein said step of directing uses both said first and second grating portions, each to direct at least a portion of both said modulated main beam and pair of modulated sub-beams away from said optical axis 63. The method of claim 58 wherein said step of providing a radiation detector includes positioning first and second detector elements outside the path of said scanning beam;
    said step of focusing using said wedge prism method to direct at least a portion of at least said modulated main beam away from the path of said scanning beam to said first and second detector elements to produce focus information therefrom.

64. The method of claim 63 wherein said step of providing a second diffraction grating provides a second diffraction grating having first and second grating portions divided along a dividing line;
    said step of directing using said first grating portion to direct at least a portion of at least said modulated main beam to said first and second detector elements.

65. The method of claim 58 wherein said step of reading includes using a four quadrant detector for recovering said main beam and using a pair of sub-beam detectors for providing tracking information according to the three beam method.

66. The method of claim 65 wherein said step of using uses said four quadrant detector for recovering said information from said main beam to provide focusing information according to the wedge prism method.

67. The method of claim 65 wherein said step of using a four quadrant detector recovers said information from said main beam and provides focusing information according to the astigmatic method.

68. The method of claim 65 further comprising increasing astigmatic distortion in said modulated main beam to improve focusing performance.

69. The method of claim 58 wherein said step of providing a second diffraction grating provides a second diffraction grating having first and second grating portions divided by a dividing line.

70. The method of claim 69 wherein said step of providing a radiation detector includes using detector pairs for recovering said modulated main beam and using a pair of sub-beam detectors for providing tracking information according to the three beam method;
    said step of directing first and second portions of said modulated main beam to corresponding first and second differential detector pairs.

71. The method of claim 58 further comprising orienting the grating lines of said second diffraction grating to compensate for fluctuations in the wavelength of the radiation source.

72. The method of claim 69 wherein said radiation detector includes first and second adjacently disposed detector pairs for recovering said modulated main beam and a pair of sub-beam detectors for providing tracking information according to the three beam method;
    said step of directing using each of said two grating portions of said second diffraction grating to direct a portion of said modulated main beam to a corresponding first and second differential detector pair.

73. An apparatus for optically scanning a radiation reflecting information plane, which apparatus comprises
    a radiation source supplying a scanning beam,
    an objective system for focusing the scanning beam to a scanning spot in the information plane and for re-imaging the scanning spot on a composite radiation-sensitive detection system, and
    a first diffraction element arranged in the radiation path between the radiation source and the objective system for deflecting a part of the radiation reflected by the information plane to the radiation-sensitive detection system and for deforming the deflected scanning beam in such a way that a focus-error signal can be derived therefrom by means of the composite detection system, characterized in that
    a second, single diffraction element is arranged between the radiation source and the first diffraction element for splitting the beam supplied by the radiation source into a scanning beam and two auxiliary beams which form the scanning spot and the two auxiliary spots, respectively, in the information plane, in that the composite detection system comprises
    extra detectors for the re-imaged auxiliary spots and in that the second diffraction element is so small and is arranged at such position that the beams diffracted by the first diffraction element do not reach the second diffraction element.

74. An apparatus as claimed in claim 73, characterized in that the two diffraction elements are radiation-transmissive.

75. An apparatus as claimed in any one of claims 73 or 74, characterized in that the second diffraction element is a diffraction grating having a constant grating period and whose grating strips are substantially transverse to the effective track direction, in that the first diffraction element is a diffraction grating having a varying grating period and in that the composite detection system comprises four detectors which are arranged in four different quadrants around the chief ray of the scanning beam deflected by the first diffraction grating, the shape of the re-imaged scanning spot being determined by means of said detectors.

76. An apparatus as claimed in claim 75, characterized in that the first grating has straight grating strips and a linearly varying grating period.

77. An apparatus as claimed in claim 75, characterized in that the grating strips of the first grating are curved and in that the separating strips of the four-quadrant detector are parallel and are substantially transverse to the effective track direction.

78. An apparatus as claimed in any one of claims 73 or 74, characterized in that the second diffraction element is a diffraction grating having a constant grating period and whose grating strips are substantially transverse to the effective track direction in that the first diffraction element is a composite grating comprising two sub-gratings and splitting the deflected scanning beam into two sub-beams, and in that the composite detection system comprises two detector pairs, a first and a second sub-beam cooperating with a first and a second detector pair, respectively.

79. An apparatus as claimed in claim 78, characterized in that the sub-gratings have a varying grating period and in that the grating strips of the sub-gratings are curved.

80. An apparatus as claimed in claim 78, characterized in that the grating strips of the one sub-grating have the same main direction as those of the other sub-grating, in that the average grating periods of the sub-gratings are different, and in that the detector pairs are juxtaposed in a direction parallel to the bounding line between the sub-gratings.

81. An apparatus as claimed in claim 78, characterized in that the sub-gratings have the same average grating period, in that the main directions of the grating strips of the one sub-grating extend at a first angle and those of the other sub-grating extend at a second angle to the bounding line of the two sub-gratings, and in that the detector pairs are juxtaposed in a direction transversely of the direction of the said bounding line.

82. An apparatus as claimed in claim 76, in which one detector is provided for each deflected auxiliary beam, characterized in that the two detectors are located on either side of the four-quadrant detector, viewed in the direction transverse to the effective track direction.

83. An apparatus as claimed in claim 81, characterized in that in the composite detection system, viewed in the direction transverse to the effective track direction, a first and a second detector for receiving the first and the second auxiliary beam are located on a first and a second side, respectively, of the two juxtaposed detector pairs.

84. An apparatus as claimed in claim 81, characterized in that in the composite detection system a first and second, and a third and fourth detector are provided for the first and second auxiliary beams, respectively, which are each split into two sub-beams by the first diffraction grating, and in which, viewed in the direction transverse to the effective track direction, the four detectors and the two detector pairs are juxtaposed in the sequence first detector, first detector pair, third detector, second detector, second detector pair and fourth detector.

85. An apparatus as claimed in claim 81, characterized in that the grating strips of the first diffraction grating are substantially parallel to those of the second diffraction grating and in that, viewed in the effective track direction, a first detector for the first auxiliary beam and a second detector for the second auxiliary beam are located on different sides of the two detector pairs, which pairs are juxtaposed, viewed in the direction transverse to the effective track direction.

86. An apparatus as claimed in claim 80, characterized in that in the composite detection system a first and second, and a third and fourth detector are provided for the first and second auxiliary beams, respectively, which are each split into two auxiliary sub-beams by the first diffraction grating, and in which, viewed in directions transverse to the effective track direction, the first and third detectors are located on either side of the first detector pair and the second and fourth detectors are located on either side of the second detector pair.

87. An apparatus as claimed in claim 82, characterized in that the separating strips of the two detector pairs are substantially parallel to a line connecting the center of the radiation-emitting surface of the diode laser to the center of the composite radiation-sensitive detection system.

88. An apparatus as claimed in claim 79, characterized in that the grating strips of the one sub-grating have the same main direction as those of the other sub-grating, in that the average grating periods of the sub-gratings are different, and in that the detector pairs are juxtaposed in a direction parallel to the bounding line between the sub-gratings.

89. An apparatus as claimed in claim 79, characterized in that the sub-gratings have the same average grating period, in that the main directions of the grating strips of the one sub-grating extend at a first angle and those of the other sub-grating extend at a second angle to the bounding line of the two sub-gratings, and in that the detector pairs are juxtaposed in a direction transversely of the direction of said bounding line.

90. An apparatus as claimed in claim 77, in which one detector is provided for each deflected auxiliary beam characterized in that the two detectors are located on either side of the four-quadrant detector, viewed in the direction traverse to the effective track direction.

91. An apparatus as claimed in claim 89, characterized in that in the composite detection system, viewed in the direction transverse to the effective track direction, a first and a second detector for receiving the first and the second auxiliary beam are located on a first and a second side, respectively, of the two juxtaposed detector pairs.

92. An apparatus as claimed in claim 89, characterized in that the grating strips of the first diffraction grating are substantially parallel to those of the second diffraction grating and in that, viewed in the effective track direction, a first detector for the first auxiliary beam and a second detector for the second auxiliary beam are located on different sides of the two detector pairs, which pairs are juxtaposed viewed in the direction transverse to the effective track direction.

93. An apparatus as claimed in claim 88, characterized in that in the composite detection system a first and second, and a third and fourth detector are provided for the first and second auxiliary beams, respectively, which are each split into two auxiliary sub-beams by the first diffraction grating, and in which, viewed in directions transverse to the effective track direction, the first and third detectors are located on either side of the first detector pair and the second and fourth detectors are located on either side of the second detector pair.

94. An apparatus as claimed in claim 90, characterized in that the separating strips of the two detector pairs are substantially parallel to a line connecting the center of the radiation-emitting surface of the diode laser to the center of the composite radiation-sensitive detection system.

95. An apparatus as claimed in claim 73, in which the radiation source is a diode laser and the radiation-sensitive detection system comprises a composite photodiode.

96. An apparatus as claimed in claim 78, characterized in that the main directions of the grating strips of the first sub-grating extend at a first angle and those of the grating strips of the second sub-grating extend at a second angle to the bounding line between the sub-gratings and in that the detector pairs occupy different positions in a direction perpendicular to the said bounding line.

97. An apparatus as claimed in claim 79, characterized in that the main directions of the grating strips of the first sub-grating extend at a first angle and those of the grating strips of the second sub-grating extend at a second angle to the bounding line between the two sub-gratings and in that the detector pairs occupy different positions in a direction perpendicular to the said bounding line.

98. An apparatus as claimed in claim 89, characterized in that in the composite detection system a first and second, and a third and fourth detector are provided for the first and second auxiliary beams, respectively, which are each split into two sub-beams, respectively, which are each split into two sub-beams by the first diffraction grating, and in which, viewed in the direction transverse to the effective track direction.

* * * * *